United States Patent
Swars

(10) Patent No.: US 6,537,681 B1
(45) Date of Patent: Mar. 25, 2003

(54) HONEYCOMB AND PROCESS FOR ITS MANUFACTURE

(76) Inventor: Helmut Swars, Riedweg 11 51429, Bergisch Gladbach (DE)

( * ) Notice: Subject to any disclaimer, the term of this patent is extended or adjusted under 35 U.S.C. 154(b) by 0 days.

(21) Appl. No.: 09/569,239

(22) Filed: May 11, 2000

(30) Foreign Application Priority Data

May 14, 1999 (DE) ............................................ 199 22 357

(51) Int. Cl.[7] ............................. B01J 35/04; F01N 3/28
(52) U.S. Cl. .................... 428/593; 428/603; 422/180; 502/527.22
(58) Field of Search ................................ 428/593, 603, 428/596; 422/180; 502/527.22

(56) References Cited

U.S. PATENT DOCUMENTS

| | | | | |
|---|---|---|---|---|
| 4,793,136 A | * | 12/1988 | Whittenberger | 60/299 |
| 5,118,477 A | * | 6/1992 | Takikawa et al. | 422/179 |
| 5,411,711 A | * | 5/1995 | Swars | 422/177 |
| 5,413,767 A | * | 5/1995 | Breuer et al. | 422/174 |
| 5,464,679 A | * | 11/1995 | Maus et al. | 428/116 |
| 5,525,309 A | * | 6/1996 | Breuer et al. | 422/174 |
| 5,593,645 A | | 1/1997 | Steenackers et al. | 422/176 |
| 5,948,504 A | * | 9/1999 | Swars et al. | 428/116 |
| 6,036,926 A | * | 3/2000 | Wieres | 422/180 |

FOREIGN PATENT DOCUMENTS

| | | |
|---|---|---|
| DE | 37 26 072 | 2/1989 |
| DE | 195 39 168 | 4/1997 |
| EP | 0 298 943 | 1/1989 |
| EP | 0 543 710 | 5/1993 |
| GB | 2 174 615 | 11/1986 |
| JP | 09-103686 | * 4/1997 |
| WO | WO 81/01250 | * 5/1981 |

* cited by examiner

Primary Examiner—John J. Zimmerman
(74) Attorney, Agent, or Firm—Browdy and Neimark, P.L.L.C.

(57) ABSTRACT

The invention relates to a honeycomb, particularly a catalytic converter substrate, with a honeycomb structure comprising a large number of ducts running in the longitudinal direction of the honeycomb, through which a fluid can flow, where the honeycomb displays structured foils arranged one above the other that are arranged to form plane or curved foil layers, and at least one stiffening element, introduced into the honeycomb structure, that extends essentially parallel to the foils, at least in parts. In order to create a honeycomb that displays sufficient stability with high resistance to thermal shocks, that permits the most favourable possible design of the flow ducts in terms of flow and that is simple and inexpensive to manufacture, it is proposed that stiffening elements be introduced into the honeycomb, the dimensions of which transverse to their longitudinal direction are small compared to the dimensions of the honeycomb structure in this direction.

23 Claims, 19 Drawing Sheets

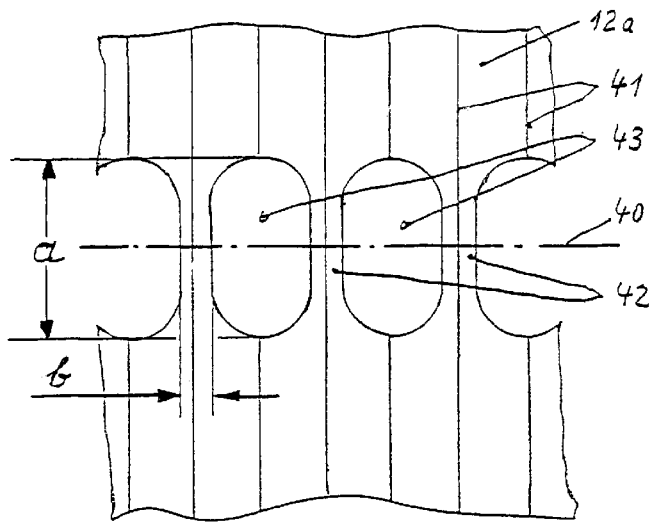
Fig. 5
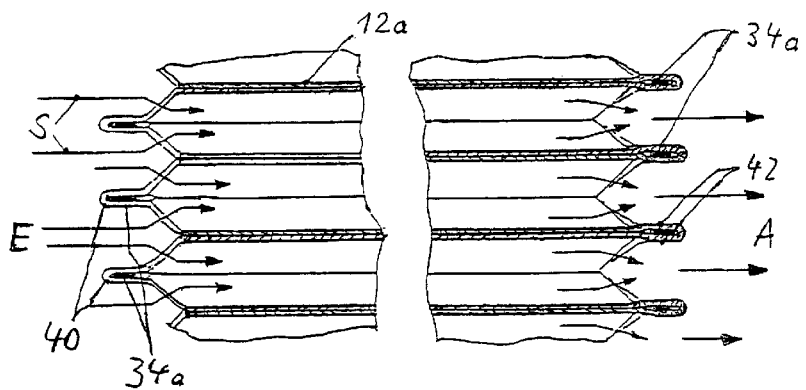
Fig. 6
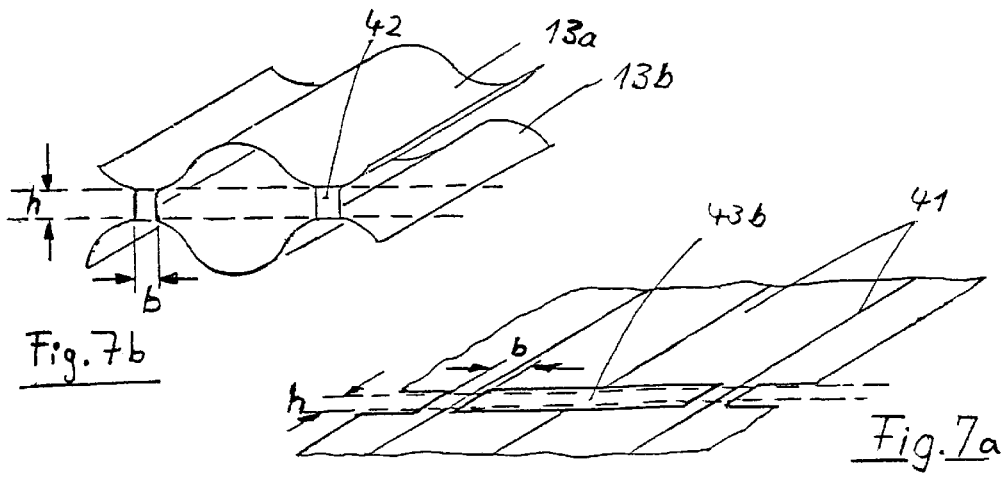
Fig. 7b
Fig. 7a

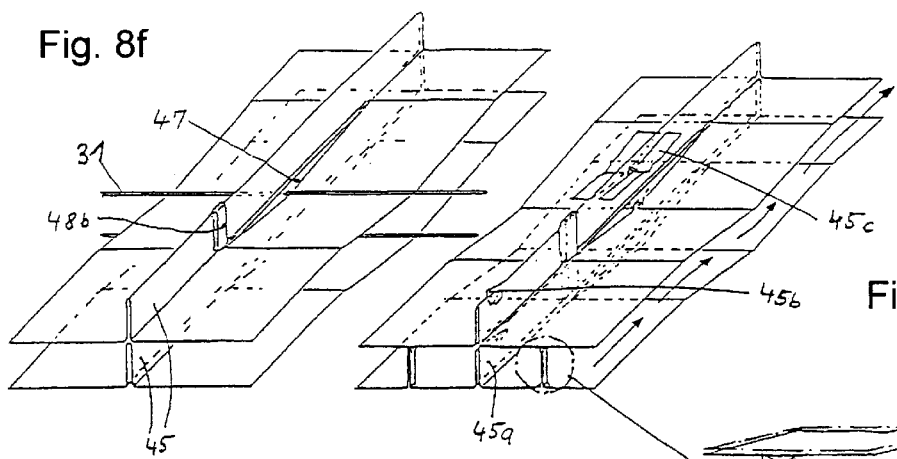
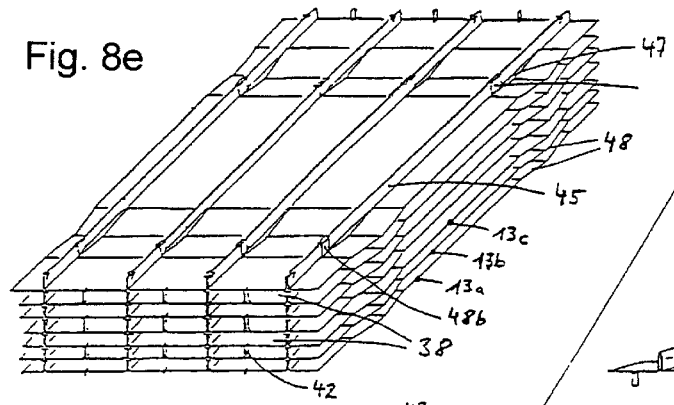
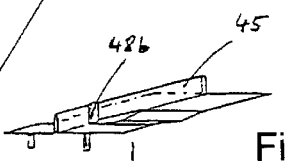
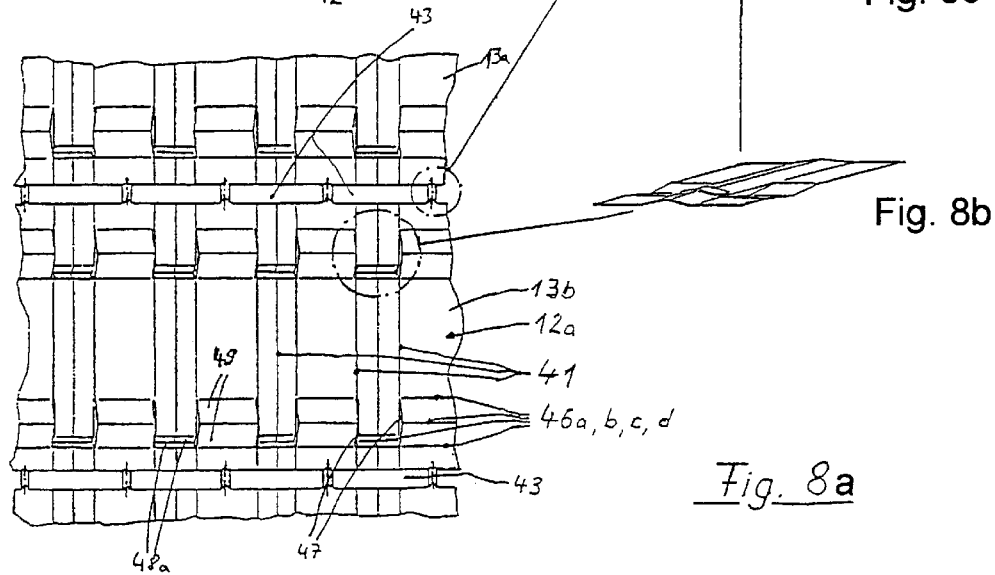

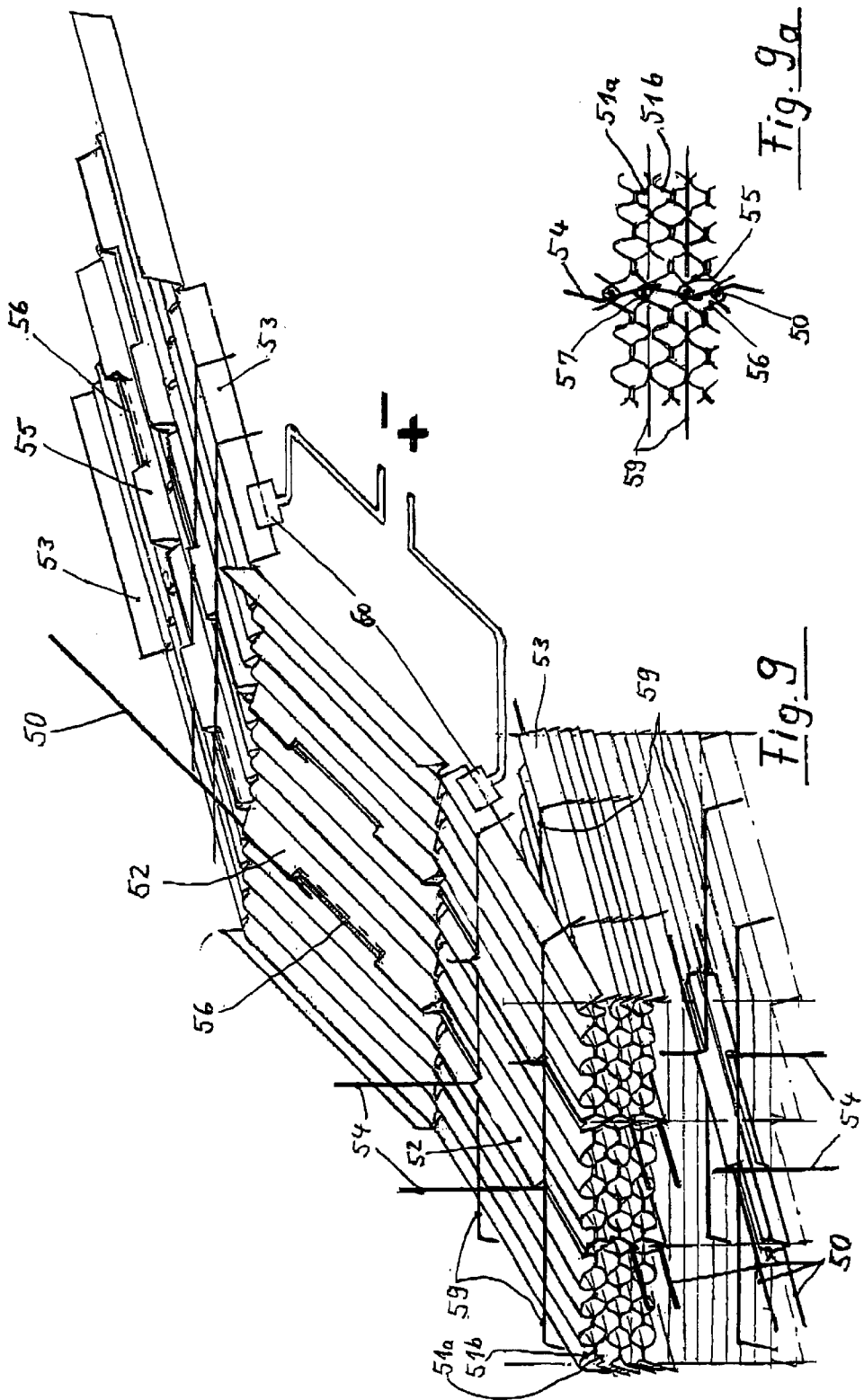

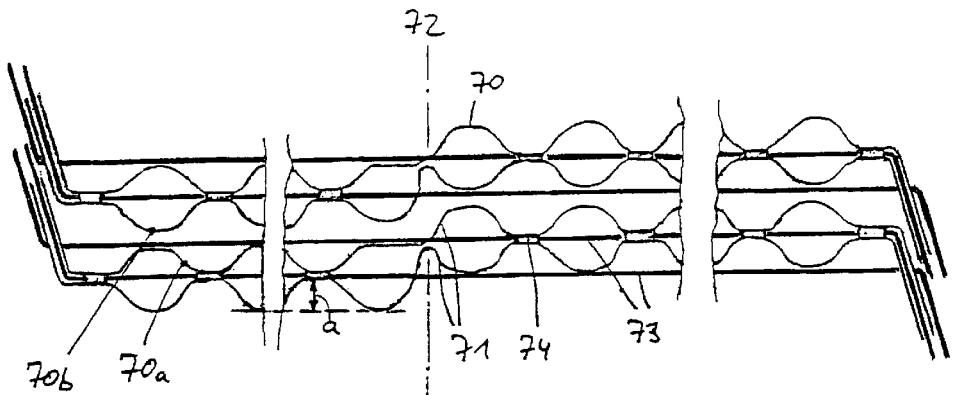
Fig. 12b
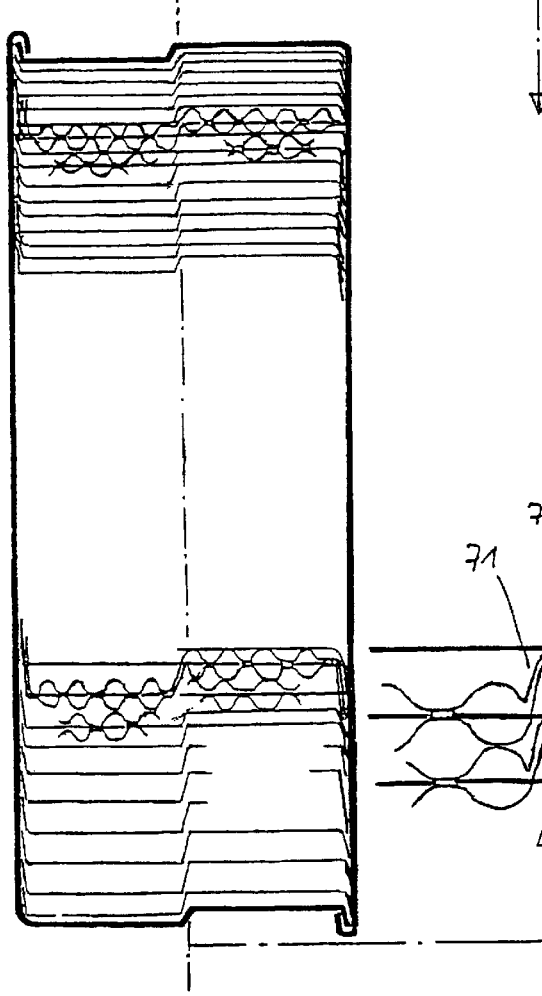
Fig. 12a
Fig. 12c

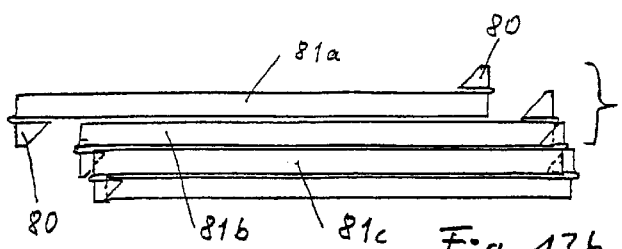
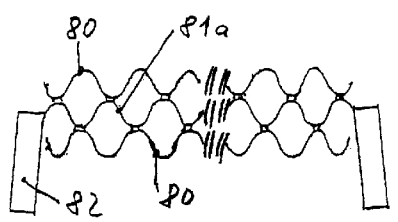
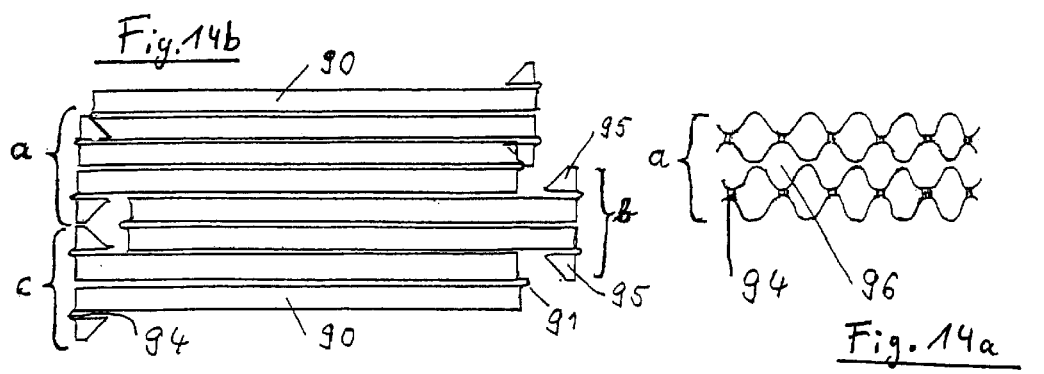
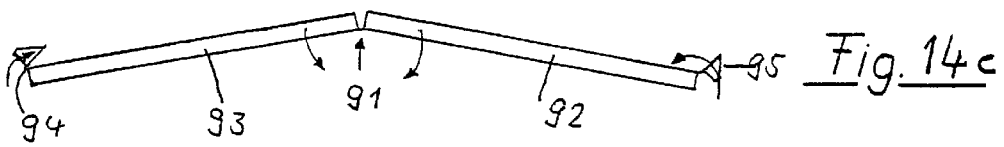
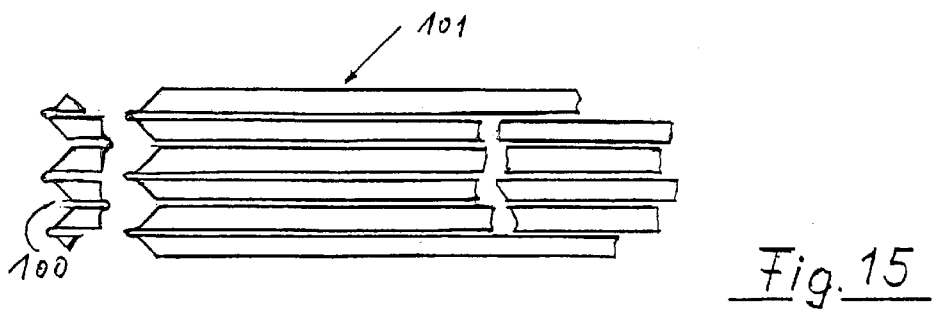

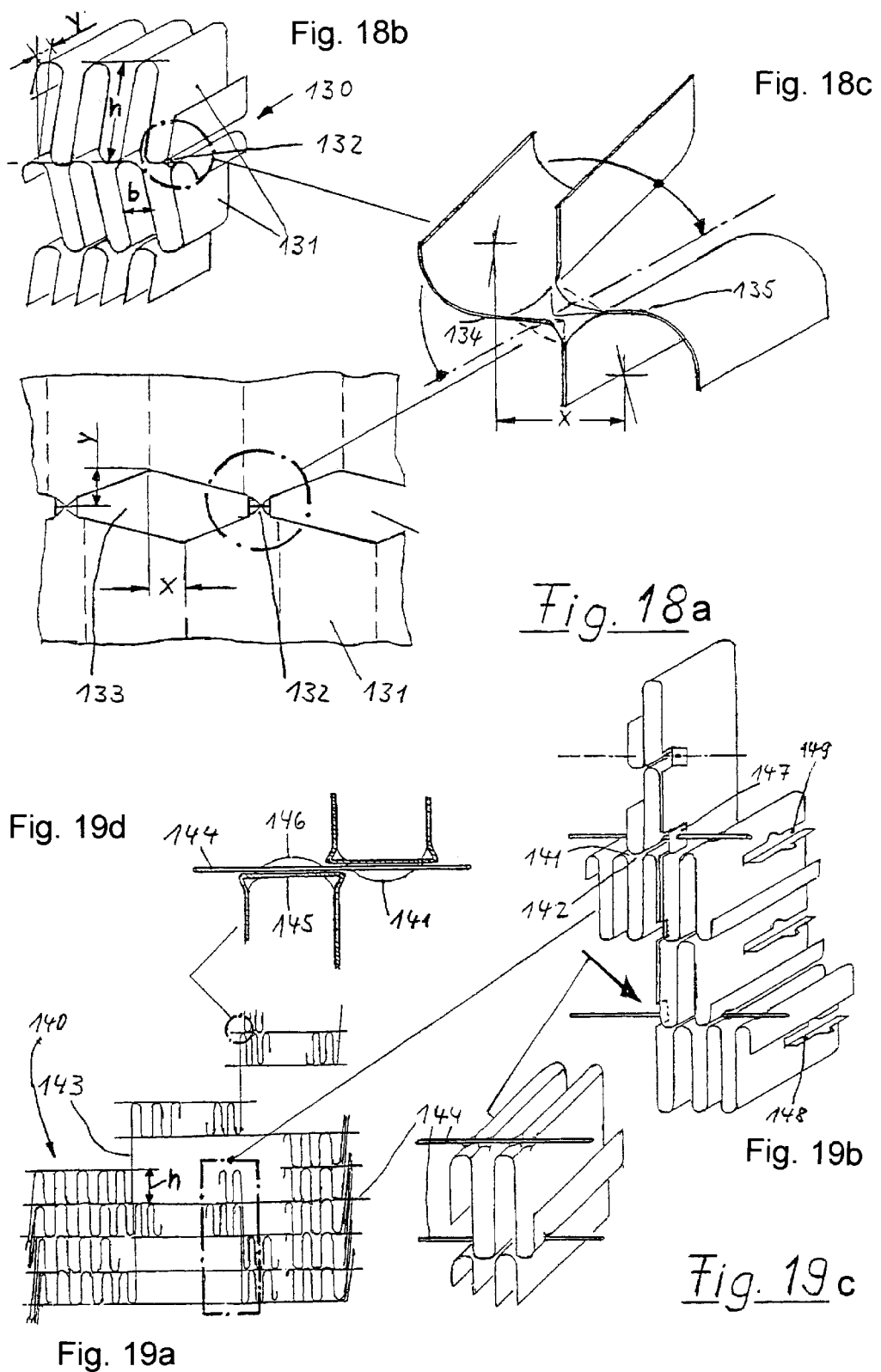

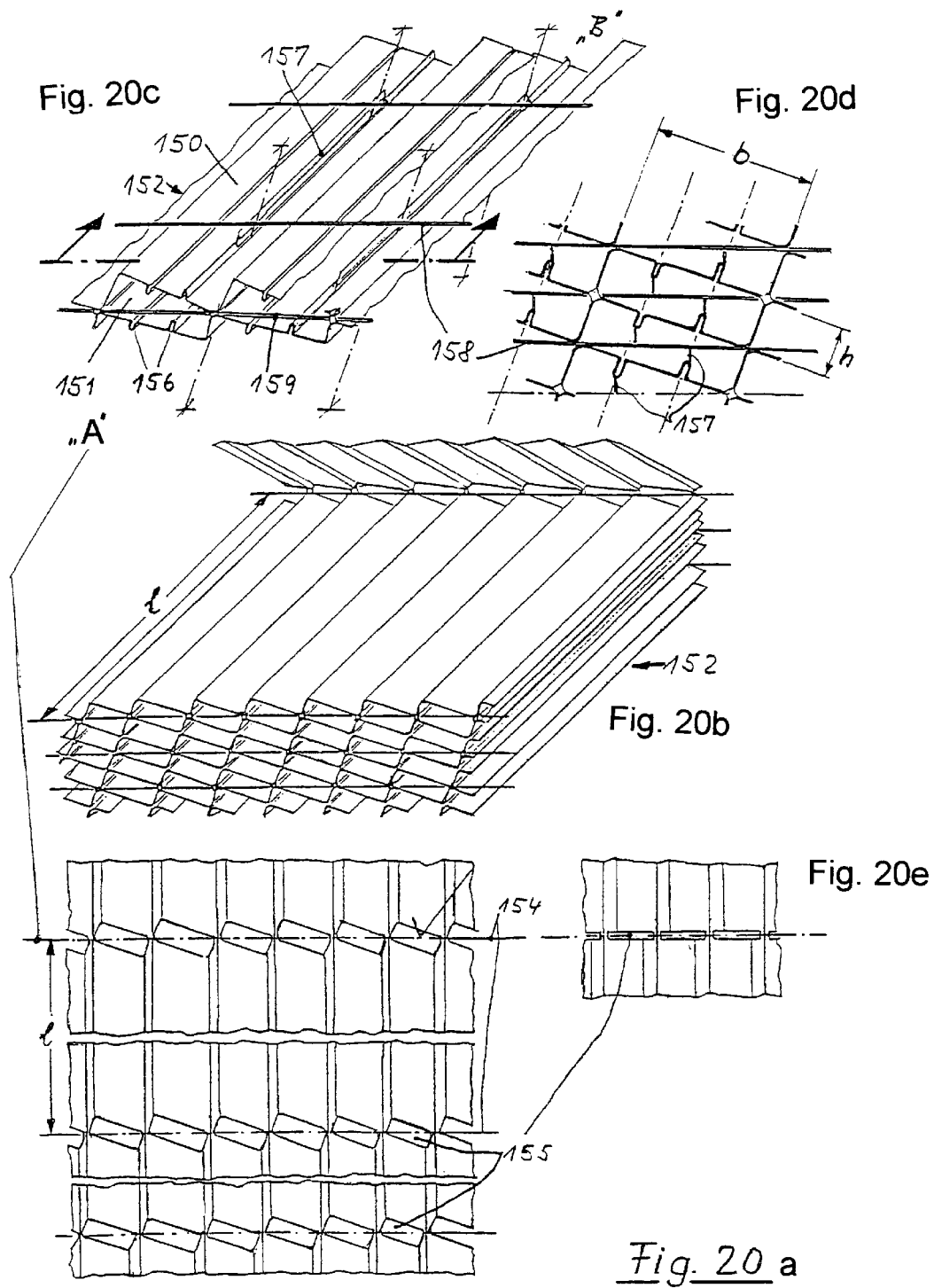

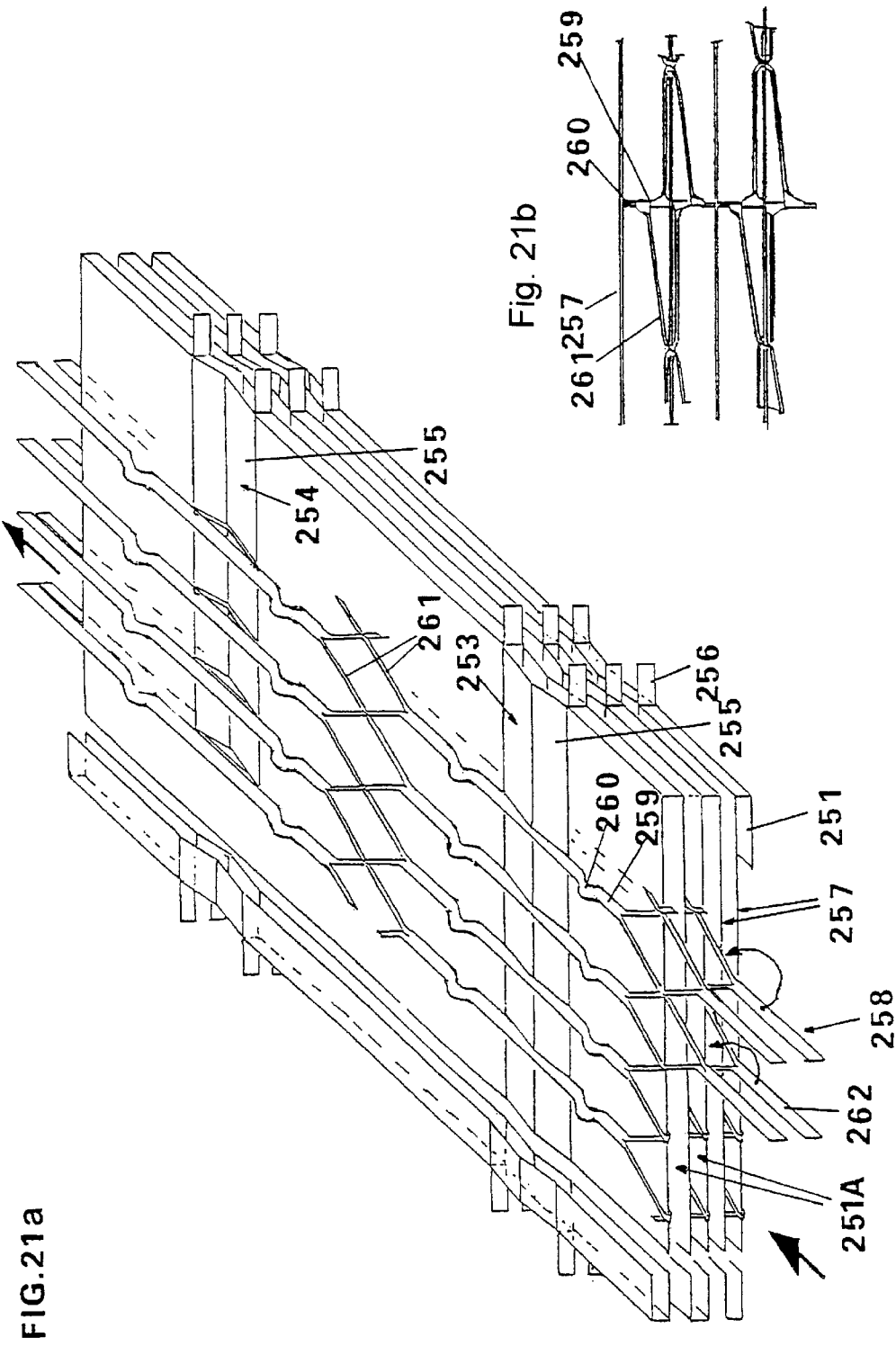

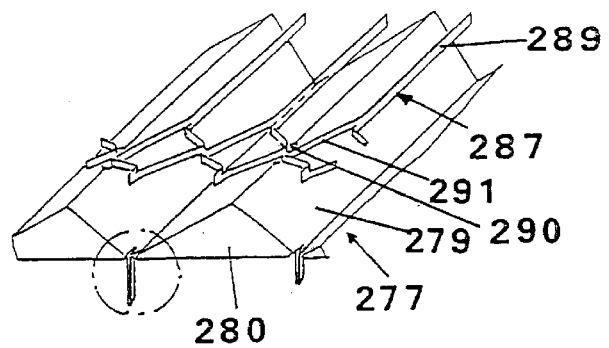
FIG.22
Fig. 23a
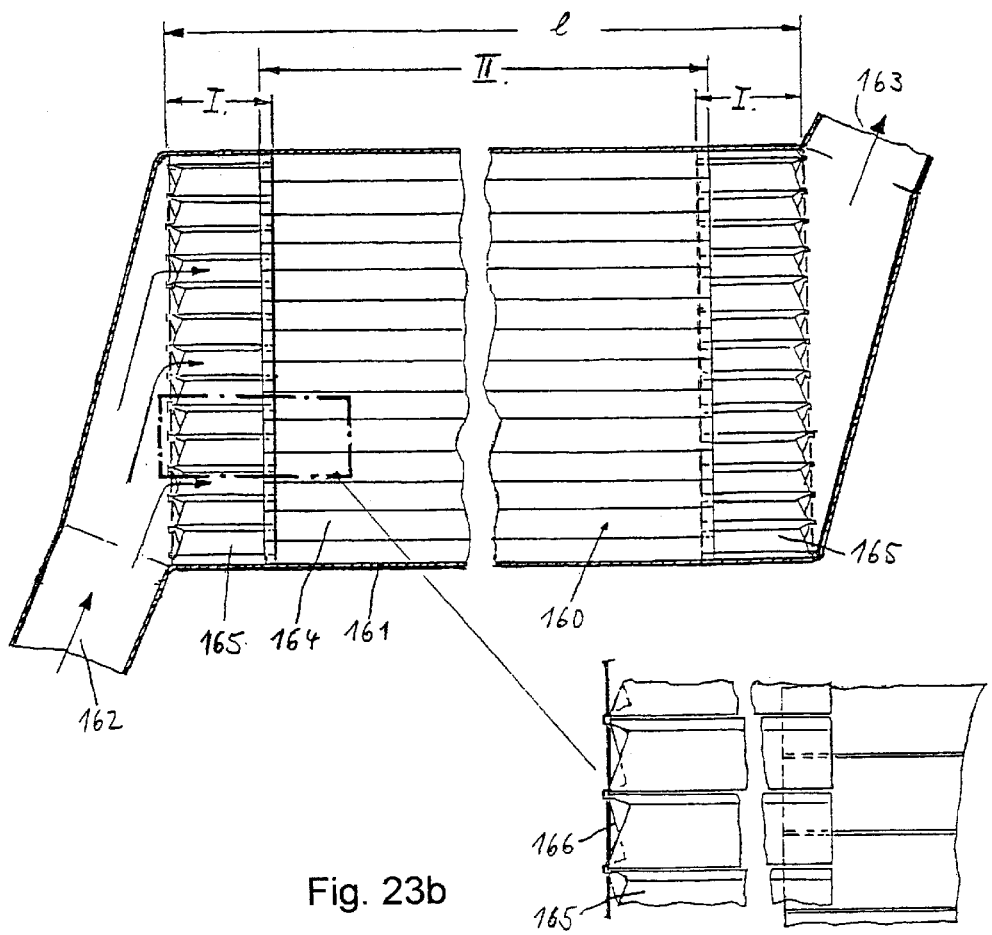
Fig. 23b

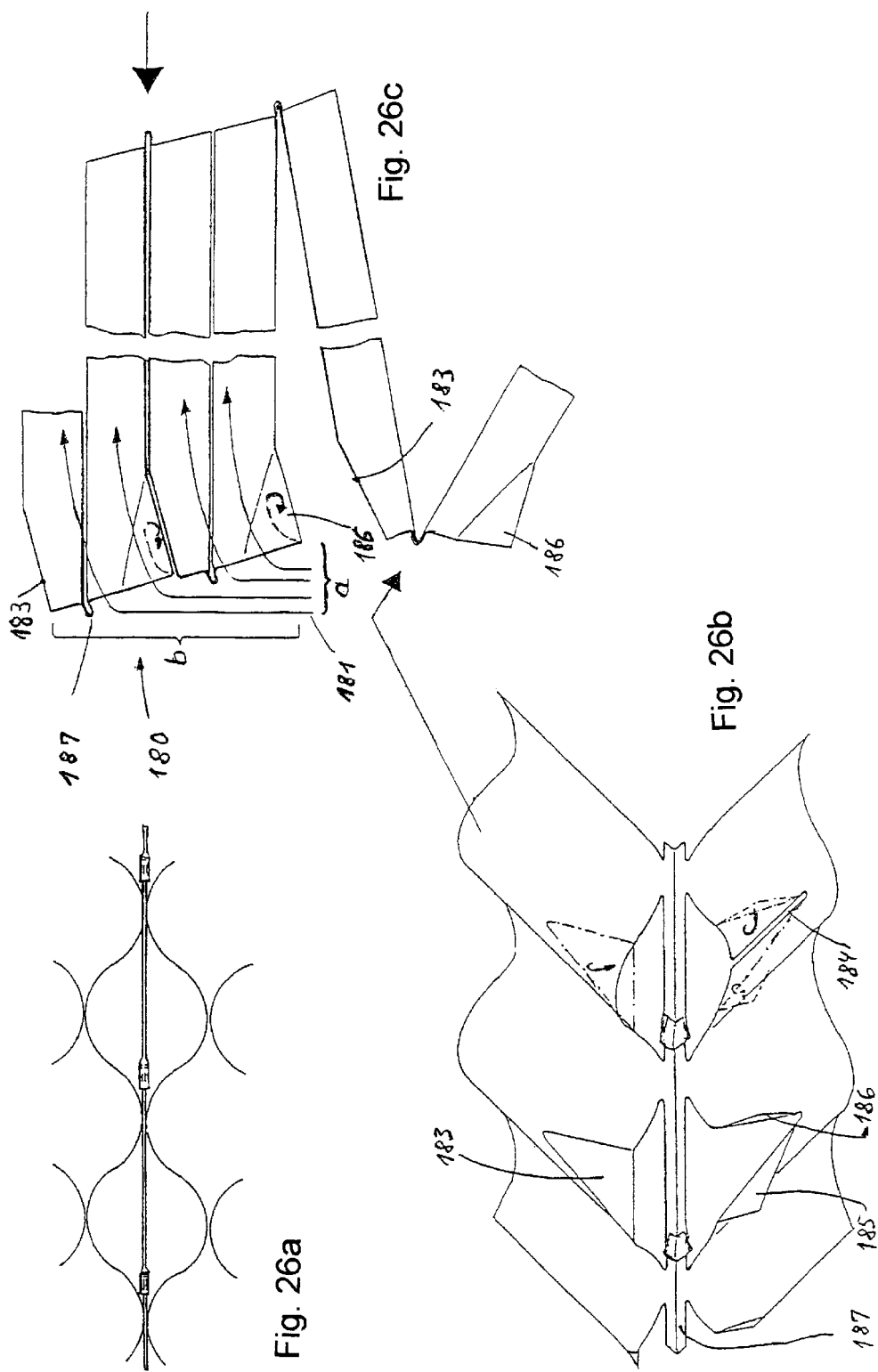

Fig. 27c
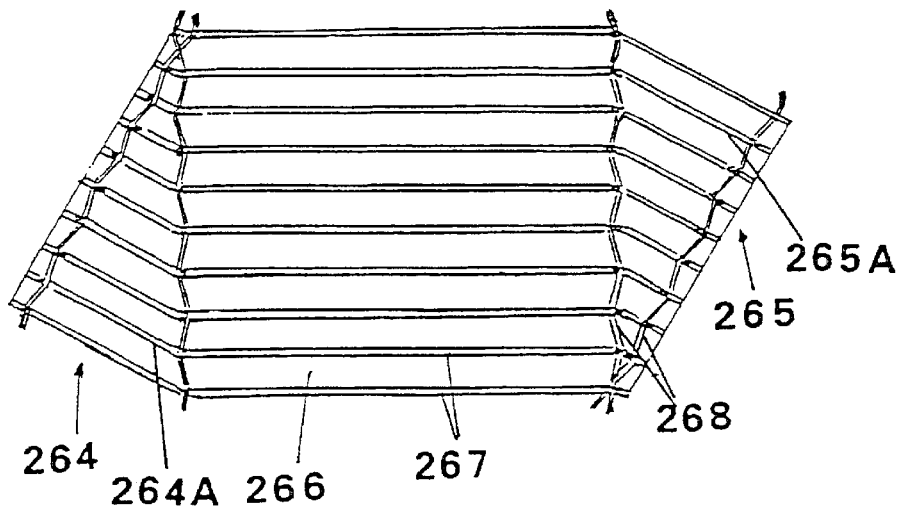
Fig. 27b
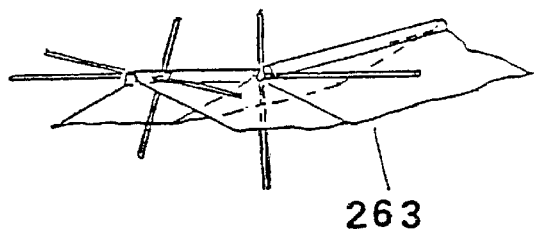
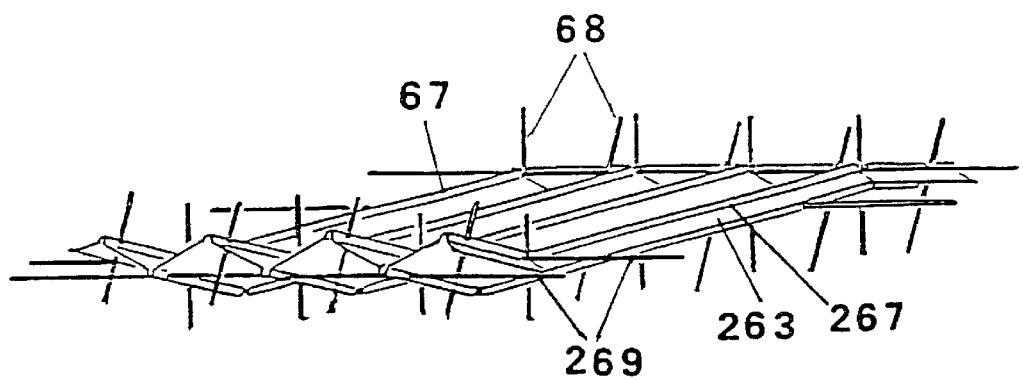
FIG. 27a

Fig. 28a
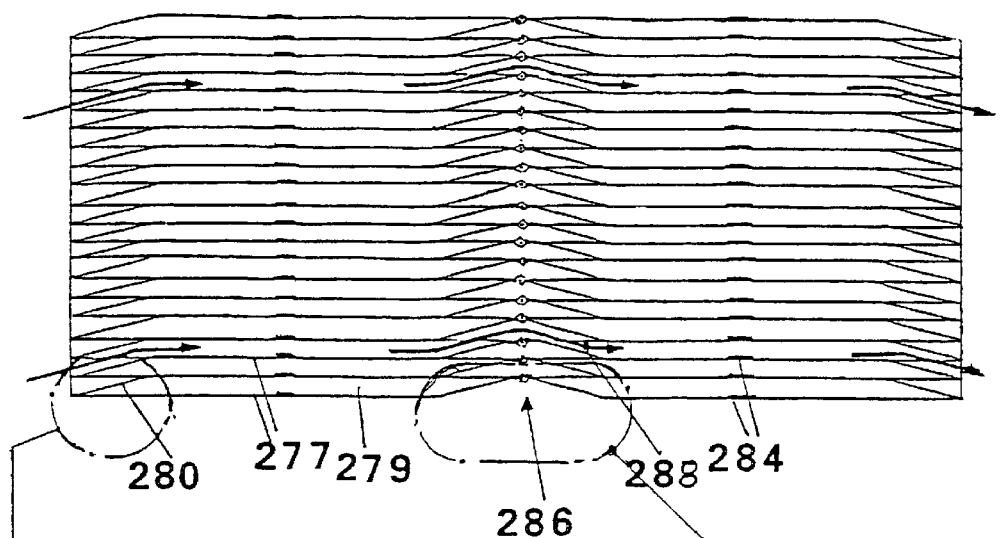
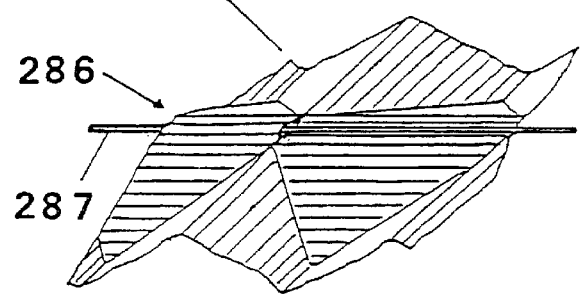
Fig. 28b
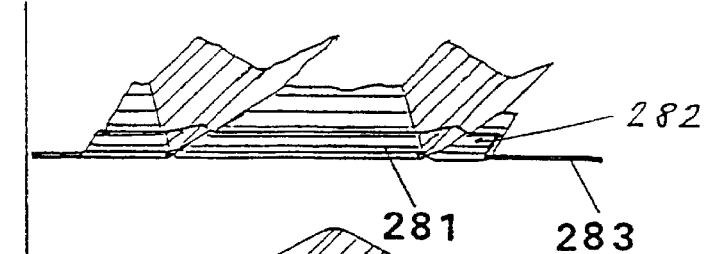
Fig. 28c
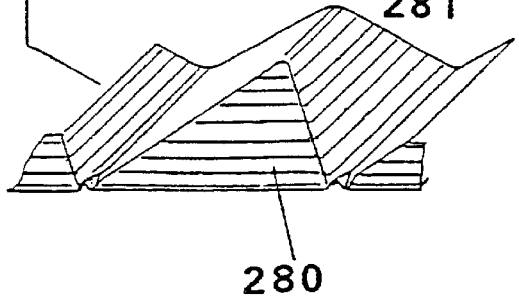
Fig. 28d

Fig. 30
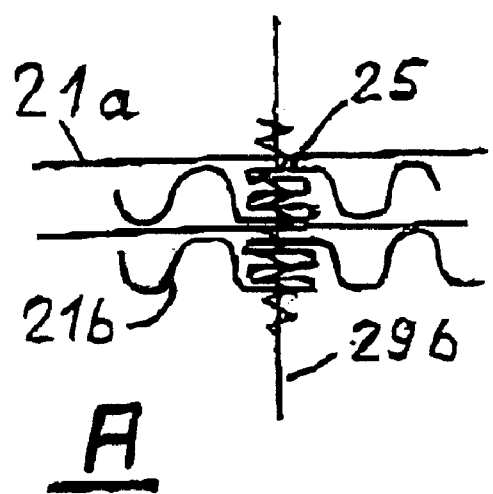
A
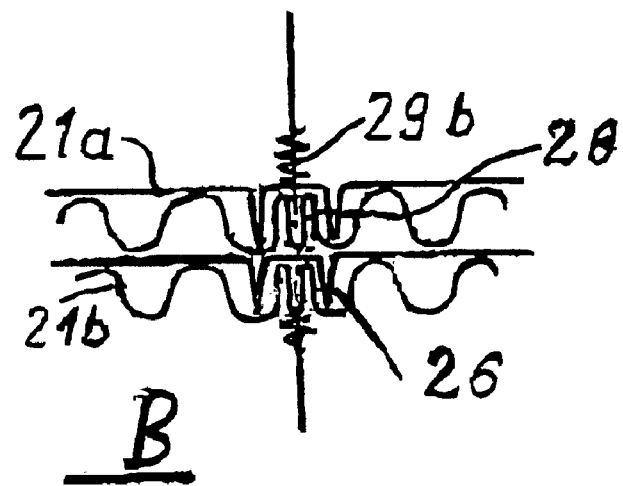
B
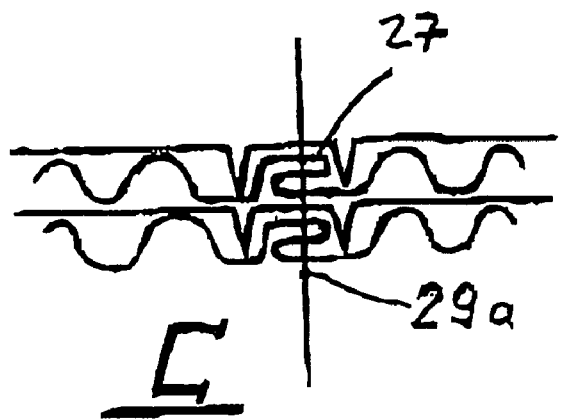
C

HONEYCOMB AND PROCESS FOR ITS MANUFACTURE

FIELD OF THE INVENTION

The invention relates to a honeycomb, particularly a catalytic converter substrate, pursuant to the generic part of Claim 1 and a process for its manufacture.

BACKGROUND OF THE INVENTION

A honeycomb of this type is known from DE 27 33 640, which consists of an alternating arrangement of corrugated and plane foil layers. The flow ducts, which display a sinusoidal or triangular cross-section, are, however, unfavourable in terms of the catalytic function, as the gussets of the ducts are virtually ineffective, particularly in the case of laminar flow. In addition, the properties of the honeycomb under fluctuating temperature conditions are unfavourable because the large-area soldering of the plane and corrugated foils results in a very stiff honeycomb structure. As a result, however, local and temporal temperature fluctuations cannot be adequately balanced out, as a result of which the geometry of the flow ducts is subject to irreversible changes and cracks can occur in the cell walls, this being intensified by vibratory stresses on the honeycomb. The service life of honeycombs of this kind is thus in need of improvement.

In order to increase the stability of the honeycomb, it is moreover known from EP 0 245 738 that rigid bearing walls extending into the honeycomb are provided. The manufacture of honeycombs of this kind is, however, relatively complex, as the foil layers have to be cut through for this purpose. In addition, the fastening of the thin foils to the comparatively thick, rigid bearing walls presents a problem.

SUMMARY OF THE INVENTION

The object of the invention is to create a honeycomb that displays sufficient stability with high resistance to thermal shocks, that permits the most favourable possible design of the flow ducts in terms of flow and that is simple and inexpensive to manufacture.

According to the invention, this object is solved by a honeycomb with the features of Claim 1. Due to the fact that the dimensions of the stiffening elements, which run essentially parallel to the foil layers, transverse to their longitudinal direction, is small compared to the dimensions of the honeycomb structure in this direction, mass transport within the flow ducts, and thus also the effective reaction cross-section of the ducts, is virtually not reduced. Unfavourable cross-section geometries resulting from the formation of gussets thus virtually do not occur at all, or only in areas of small volume. In addition, owing to their orientation parallel to the foil layers, the stiffening elements can easily be incorporated into the honeycomb structure during its manufacture. A certain degree of stiffening is already achieved by the minimum distance between adjacent foil layers being limited in the case of structured foils, meaning that foil structures, for example, are supported by the stiffening elements. In particular, the stiffening elements can prevent elongation of the honeycomb structure in a direction perpendicular to the flow ducts or foil profiles, which would lead to the undesirable formation of spaces between foil layers of different elongation and thus to unfavourable vibratory stresses in the honeycomb structure. Moreover, as a result of the stiffening elements introduced, the honeycomb according to the invention can be made up of foils with virtually any desired structure or orientation, as it is no longer necessary to fasten the foil layers to each other.

The stiffened areas of the honeycomb structure can have punctiform or locally isolated dimensions or, in the case of stiffening elements of corresponding length, they can form stiffening zones. In all cases, the stiffening elements according to the invention locally fix the foils relative to each other more strongly, thus producing larger areas of the honeycomb structure displaying high flexibility.

In order to achieve sufficient stabilisation of the honeycomb structure, it suffices in itself for the length of the stiffening elements, regardless of the direction in which they extend, to be equal to or greater than the transverse dimension of a duct in one direction, e.g. height or width, and for them to bridge a flow duct, for example, i.e. to act on opposite walls of a duct or the housing. Also, the stiffening elements can extend only over several duct diameters transverse to the longitudinal direction of the duct, e.g. 5 to 10 duct diameters, or over the entire width of the honeycomb. In the case of non-isometric or non-isogonal ducts, the stiffening elements can also extend over only part of the duct cross-section amounting to a multiple of the duct dimension in the cross-sectional direction of smaller size, e.g. twice this dimension or more.

Advantageously, the dimension of the stiffening elements transverse to their longitudinal dimension is small compared to the dimensions of the flow ducts in this direction, e.g. in the range of $1/10$ to $1/50$ of the dimension of the flow ducts in this direction or less, without being limited to these values. The transverse dimension of the stiffening elements can be $1/100$ to $1/1000$ or less of the duct length, for example, if these run transverse or at an angle to the ducts. Accordingly, when using the same material, the width of the stiffening elements can be just 0.5 to 10 times, preferably 1 to 5 times, the thickness of the foils making up the honeycomb structure, without being limited to these values.

If, for example, a honeycomb is available which has a flow duct length of 100 mm and a flow duct diameter of 1 mm, strip-like stiffening elements with a width of several millimeters and/or stiffening wires with a diameter of several hundredths to several tenths of a millimeter arranged transverse to the flow ducts can be provided. If the stiffening elements are arranged in the longitudinal direction of the ducts, their width can be in the range of 0.01 to 0.5 mm, preferably 0.003 to 0.2 mm. It goes without saying that, given corresponding honeycombs with larger duct diameters, which can easily also be in the region of approx. 1 cm or more for corresponding applications, the stiffening elements can display correspondingly larger diameters or widths.

It is also possible for several stiffening elements to be assigned to one foil or one pair of foils or several adjacent foils.

The stiffening elements preferably extend over the entire honeycomb structure in their longitudinal direction.

The stiffening elements are advantageously designed to be elastically deformable under operating conditions, perpendicular to their longitudinal direction, particularly in the direction of the flow ducts.

The stiffening elements can run between adjacent foil layers, although they can also pass through profiled foils or be woven into plane foils, and/or connect adjacent foils to each other.

In their longitudinal direction, the stiffening elements are advantageously connected to the foil layers and/or the housing in a manner capable of absorbing tensile forces, e.g. by means of suitable jointing techniques, such as welded connections, positive, frictional and/or material connections. However, connection of the stiffening elements to the foil layers, in particular, can also be achieved by coating with a ceramic material required to produce a catalytic coating.

In order to achieve frictional connection of the stiffening elements to the foil layers, the stiffening elements can be woven into the foil layers, particularly connecting two adjacent foil layers in the process, or be clamped in corresponding folds in the foils. Areas of the foils can be notched out to this end, or the stiffening elements can be inserted into the folds of connecting webs located at the face ends of the foils. Correspondingly, the structured areas, such as the foil corrugations, can also be provided with notched tabs or projections running in the longitudinal direction of the ducts, these being arranged one behind the other, possibly at an offset height, and forming a lead-through for wires or the like running parallel to the flow ducts.

However, an increase in the dimensional stability of the honeycomb is already achieved if the stiffening elements loosely support the foils or are loosely passed through one or more foils, e.g. by providing an appropriate profile.

Particularly if they are located at the level of a foil layer or between the foil layers, the stiffening elements can also be connected to each other by way of additional stiffening or connecting struts, which can run essentially parallel to the foil layers and/or perpendicular to them. In this way, extended systems of stiffening elements can be constructed, which can extend in two or three dimensions over relatively large areas of the honeycomb or the entire honeycomb. Correspondingly, in order to stiffen the honeycomb structure, expanded-metal layers or wire mesh can also be inserted between the foil layers, these particularly being inserted into indentations of foil layer profiles and possibly secured there in a manner preventing movement.

Advantageously, the stiffening elements are connected to the foil layers under axial pretension. This makes it possible not only to increase the stiffness of the honeycomb, but also to calibrate the geometry of the flow ducts or the dimensions of the honeycomb. In this context, the stiffening elements can be connected both to the housing of the honeycomb and to existing partition walls, these being designed as rigid bearing walls or as elastically deformable partition walls composed, for example, of fold areas of the foil layers. The fold areas can be of U, V, W or Z-shaped design, without limitation, in which context individual or several legs of the fold are joined together in order to construct the wall. The folded design of the partition walls means that they are flexible and, at the same time, that they expand under compression, this resulting in good temperature shock resistance.

If the stiffening elements running through the honeycomb structure are pretensioned, the pretensioned area of the corresponding foils can be grouped in sections. This makes it possible, for example, to provide block-type areas of high pretension and thus high stiffness within the honeycomb structure that are separated by areas of low pretension and thus increased deformability.

This kind of design with pretensioned areas within the honeycomb structure can be produced by the fastening elements on the foil layers for fastening the stiffening elements only being provided in some areas. Thus, for example, the connecting webs of foil strips folded in zigzag fashion can be removed in some areas of the lateral edge zones of the honeycomb, thus providing a zone of increased extensibility adjacent to the housing and producing a honeycomb with particularly favourable mechanical properties.

The cross-sectional geometry of the flow ducts can be adjusted by pretensioning stiffening elements fastened to the foil layers.

According to another advantageous configuration, the stiffening elements can be formed from partial sections of the foil layers.

This is particularly the case if the honeycomb is formed by a foil strip folded in zigzag fashion, where the individual foil layers are connected to each other by web-like connections in the area of the folds. In this context, the connecting webs in the area of the folds can be produced by way of punched tabs, where the fold line of the adjacent folded sections of the foil strip runs through the punched tab. The punched tab can be designed in such a way that a web running along the fold line remains, meaning that the wall areas of a flow duct that are opposite each other along the fold line can be connected to each other. In order to permit corrugation of the foil strip, the web running through the cross-section of a flow duct can be shortened by bending or folding appropriately in its longitudinal direction.

In addition, or as an alternative, to the configurations described, it is also possible to provide stiffening elements which are designed as inserts that can be inserted into the face ends of the ducts. The inserts, the outside contours of which can be adapted to the cross-sectional geometry of the ducts, prevent adjacent foil layers from sliding into each other, without substantially affecting the flow cross-section of the ducts. The inserts can be designed in such a way that they display areas that protrude from the face ends of the honeycomb when inserted and act as flow-guiding devices. These areas, which can be integrally moulded, can enable lateral inflow into the inlet area of the honeycomb and/or be arranged at an angle to the longitudinal direction of the honeycomb.

The inserts can be designed as separate components and advantageously extend over the width, possibly also over the height, of several ducts, or over the entire width and/or height of the honeycomb structure. Stiffened areas of the honeycomb structure can alternate with areas of increased extensibility in this way. By varying the arrangement of inserts at both face ends of the honeycomb, it is possible, for example, to obtain twistable honeycombs, which may be advantageous for certain fields of application. If the inserts extend over several ducts, they can be arranged both parallel and perpendicular or at an angle to the foil layers.

The inserts can also be integrally moulded to the foil layers and produced, for example, by appropriate folding of foil sections. The inserts can be designed to suit the requirements by shaping the foil ends or by punching.

Particularly if the stiffening elements are designed as inserts, the flow cross-sections can easily be varied over the length of the flow ducts. For instance, the inserts can be profiled in such a way that the flow ducts have a smaller diameter in the turbulent inlet area of the ducts than in the duct areas with laminar flow inside the honeycomb. In this context, the inlet area is advantageously divided into a large number of flow ducts, so that the total of the flow cross-sections of the ducts in the inlet area is roughly equal to the flow cross-section of the duct in the middle area of the honeycomb.

As an alternative, or in addition, to the configurations described above, the stiffening elements can also be designed as webs running along the flow ducts. In this context, the webs display a width which is substantially smaller than that of any profiles provided for producing the honeycomb structure, e.g. one-quarter or one-eighth of the same, or less. In the case of webs consisting of two side walls, both fold legs can, in particular, contact each other, advantageously over virtually the entire height, or only be such a distance apart from each other that the respective coating compound used does not penetrate the space between the legs.

The webs can extend over the entire height of the ducts or, advantageously, only over part of the same, so that gas exchange between the constituent ducts is possible. The webs can also display notched tabs, by means of which adjacent foil layers are supported or which serve to increase the catalytically active surface area. The notched tabs or the webs themselves can be used to fasten or support further stiffening elements, such as wires running transverse to them. The webs can, in particular, be designed as fold webs of the foil layers, there being beaded areas at the ends or in the middle area of the fold webs for additional stabilisation, these counteracting any spreading of the fold webs. Wires or the like can additionally be inserted in the fold webs. Fold webs may, for instance, protrude from the foil layers in a direction inclined or perpendicular to the major plane of the foil layers or at least substantially in parallel to the foil layers, which might be achieved for instance by folding the webs in a lateral direction generating double or multiple folded foil layer sections heving for instance 3 to 10 or even more folds.

In the case of structured foil layers where partial areas of one and the same foil layer are in punctiform or linear contact, the honeycomb can be stabilised by establishing punctiform or linear connections between contacting foil areas in the areas of contact. This has an influence on the longitudinal expansion characteristics of a single foil layer, where the connections can be at a distance from the top side of the structured foil layer, forming expansion legs. The foil layer as a whole thus acts as a stiffening element capable of absorbing tensile and/or compressive forces, which is produced by joining individual preformed sections of the foil layers and extends over individual or several flow ducts or results in layer doubling. Correspondingly, individual sections of the foil layers, e.g. in web form, can be notched out and joined to each other or with the foil layers in a manner capable of absorbing tensile forces in order to produce stiffening elements.

The joints within an individual foil layer can be produced by any desired jointing techniques, e.g. by spot welding, and, in particular, positive connections can be produced by means of punched and folded foil areas, the face ends of which engage an adjacent flow duct or apertures correspondingly provided for this purpose, or which are non-positively connected to the wall of a flow duct.

In addition to the stiffening elements inserted according to the invention, it is also possible to provide stiffening elements of a wide variety of configurations which extend in a perpendicular direction relative to the foil layers and connect two or more foil layers. Perpendicular direction is generally intended to mean a direction possessing a perpendicular direction component and including an angled course, e.g. at an angle of 45° relative to the foil layers.

The perpendicular stiffening elements can be designed as rigid bearing walls, although they are preferably of elastically deformable design, where one-dimensional stiffening elements can be provided, in the form of wires, strips, interconnected foil folds or the like, or two-dimensional elements in the form of deformable outer or partition walls, which particularly consist of folded sections of the foil layers. The stiffening elements running parallel to the foil layers can be fastened to the stiffening elements running vertical to the foil layers in a manner capable of absorbing tensile forces, or they can be loosely passed through or by these.

According to another advantageous configuration, the stiffening elements are located upstream, or in the inlet area, of the flow ducts, i.e. in the area of turbulent flow. The stiffening elements, which can particularly extend transverse to the flow ducts, thus form additional catalytically active surfaces at the same time. In addition, or as an alternative, projecting areas with catalytically active surfaces can also be located in the catalytically particularly effective inlet area by other measures. In particular, the stiffening elements in the inlet area, which can also be designed as strips or wires, can have a larger diameter than in the area of laminar flow. The inlet area reinforced with stiffening elements can also display foil layer sections with free ends which permit lateral inflow of a fluid on one or more sides.

If the stiffening elements are located upstream of the face ends of the flow ducts, it has proven advantageous for the distance between the outer edge of the stiffening elements facing away from the flow ducts and the face ends of the flow ducts to be in the range of 0.1 to 3 times the diameter of the ducts. If the foils are connected to each other by fold webs lying on fold lines located upstream of the face ends of the ducts, the same applies to the distance between the fold lines and the face edge of the inlet or outlet apertures of the ducts. This applies regardless of whether or not stiffening elements are located in the fold areas.

In order to improve the flow conditions, particularly in the event of angular inflow into the ducts, the duct ends can be of scoop-like design. It is also possible to provide window-like foil folds at the duct ends in order to enlarge the inlet areas with turbulent flow.

It goes without saying that the honeycomb according to the invention can be constructed not only from a profiled foil strip laid in zigzag fashion, but also from individual profiled foils, between which non-profiled foils may possibly also be arranged. In particular, individual foil layers can also be arranged one above the other in such a way that the flow ducts are produced by the profiles of opposite foil layers. The stiffening elements can also be provided within the honeycomb at a distance from the face ends of the same.

BRIEF DESCRIPTION OF THE DRAWINGS

An example of the invention is described below and explained on the basis of the figures, wherein:

FIG. 5 shows a section of an originally smooth, thin foil strip fro manufacturing a honeycomb structure according to the present invention.

FIG. 6 is a vertical longitudinal section through a honeycomb according to the present invention.

FIG. 7a is a perspective view showing a foil layer having rectangular punched holes for manufacturing a honeycomb according to the present invention.

FIG. 7b is a perspective view of a foil layer according to FIG. 7a being folded along the fold lines.

FIG. 8a is a top view on a foil layer for manufacturing a further embodiment of a honeycomb according to the present invention.

FIG. 8b is an enlarged perspective view of the foil layer according to FIG. 8a.

FIG. 8c is a perspective view of the part of the foil layer according to FIG. 8b.

FIG. 8d is a perspective view of a part of the foil layer according to FIG. 8a, being folded.

FIG. 8e is a perspective view of a zig-zag folded foil layer, according to FIG. 8a.

FIG. 8f is an enlarged view of a part of FIG. 8e.

FIG. 8g is an enlarged view of a part of the honeycomb structure according to FIG. 8e having notched tabs.

FIGS. 9 and 9a illustrate another version wherein stabilization of the honeycomb structure is provided with wires.

FIG. 12a is a diagrammatic, cross-sectional view of a honeycomb according to the invention showing two different arrangements of foil layers.

FIGS. 12b and 12c are enlarged views of the two different foil layer arrangements according to FIG. 12a, wherein the arrows designate the middle plane of the honeycomb according to the figures.

FIGS. 13a and 13b are schematic views of the face side (FIG. 13a) and lateral side (FIG. 13b) of a further embodiment of foil layers for manufacturing a honeycomb of the invention.

FIGS. 14a and 14b are a partial face views of a further embodiment of the honeycomb of the invention (FIG. 14a) and a side view of foil layers in a partially assembled state for manufacturing a honeycomb of the invention.

FIG. 14c is a side view of a partially folded foil layer for manufacturing a honeycomb as shown in FIG. 14b.

FIG. 15 is an elevational view, partly broken away of a configuration with a separate insert.

FIG. 18a is a view on a part of a foil layer for manufacturing a honeycomb of the invention.

FIG. 18b is a perspective view of a part of a foil layer of FIG. 18a, being folded.

FIG. 18c is an enlarged view of the foil layer according to FIG. 18b in a partially folded state.

FIG. 19a is a schematic cross-sectional view of a further embodiment of a honeycomb of the present invention.

FIG. 19b is a perspective view of a part of the honeycomb according the FIG. 19a and FIG. 19c is an enlarged perspective view of a part of FIG. 19b.

FIG. 19d is an enlarged view of a part of FIG. 19a.

FIG. 20a is a top view on a foil layer for manufacturing a further embodiment of a honeycomb of the present invention.

FIG. 20b is a perspective view of a zig-zag-folded foil layer according to FIG. 20a.

FIG. 20c is a perspective view of a modified foil layer of FIG. 20b having additional folded webs and additional stiffening elements.

FIG. 20d is a schematic face end view of the structure of the folded foil layer according to FIG. 20b.

FIG. 20e is a top view of a modified form of a foil layer according to FIG. 20a.

FIG. 21a is a schematic perspective view of a further embodiment of a honeycomb according to the present invention.

FIG. 21b is an enlarged face end view of the honeycomb structure according to FIG. 21a.

FIG. 22 is a perspective view of another arrangement.

FIG. 23a id a cross-sectional side view of a further embodiment of a honeycomb being arranged in a housing.

FIG. 23b is an enlarged view of a part of FIG. 23a.

FIG. 25c is a side view of a zig-zag-folded foil layer according to FIG. 25a.

FIG. 26a is a schematic face view of a part of a honeycomb according to the present invention.

FIG. 26b is a perspective view of a foil layer for manufacturing a honeycomb according to FIG. 26a in a partially unfolded state and having modified ends of the crests and depressions of the corrugations.

FIG. 26c is a schematic side view of a part of a honeycomb built by a foil layer according to FIG. 26b in a partially unfolded state.

FIG. 27a is a perspective view of a foil layer for manufacturing a honeycomb according to the preset invention with additional stiffening elements.

FIG. 27b is an enlarged view of a part of FIG. 27a.

FIG. 27c is a side view of a honeycomb being manufactured by staking foil layers according to FIG. 27a.

FIG. 28a is a schematic side view of a further embodiment of a honeycomb according to the present invention.

FIGS. 28b, 28c and 28d are perspective enlarged views of parts of the honeycomb of FIG. 28a shown with stiffening elements (FIGS. 28b and 28c) or without stiffening elements (FIG. 28d).

FIG. 29b is an enlarged view of a part of the honeycomb according to FIG. 29a.

FIG. 30 shows stiffening elements in the design of multiple folded single layered foils.

DETAILED DESCRIPTION OF THE INVENTION

Figure 1:
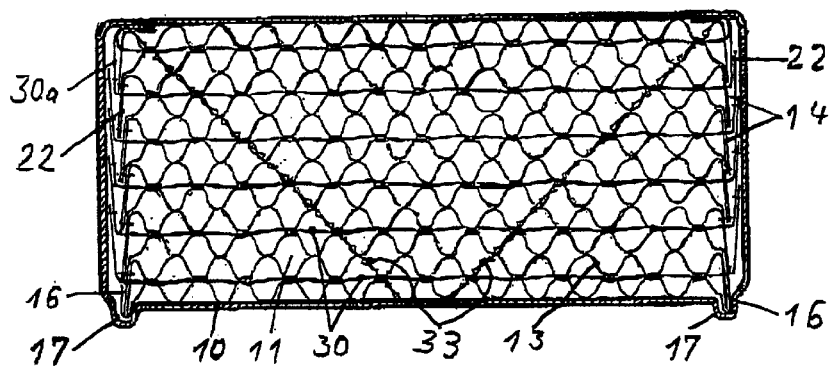
FIG. 1 is a schematic representation of a cross-section perpendicular to the longitudinal axis of a honeycomb according to the present invention.

FIG. 1 shows, in a schematic representation of a cross-section perpendicular to the longitudinal axis of the honeycomb, a cuboid honeycomb with a honeycomb structure 11 consisting of a single constituent honeycomb in a housing 10. The honeycomb structure consists of a thin foil strip with single-corrugated, structured foil sections 13 which are stacked one above the other in plane fashion. At the two longitudinal sides of the constituent honeycomb, free ends 14 of sections 13 are, by bending through an angle of approx. 90 degrees, built up into outer wall areas 22, ends 16 of which are firmly connected to housing 10 by means of beads 17.

Wires 30 are inserted between every second foil layer in order to stabilise the honeycomb structure, their ends 30a being firmly integrated in the two lateral wall areas of the constituent honeycomb. Moreover, wires 33, which run diagonally, are woven into the honeycomb structure in order to stabilise the honeycomb structure.

Figure 2A:
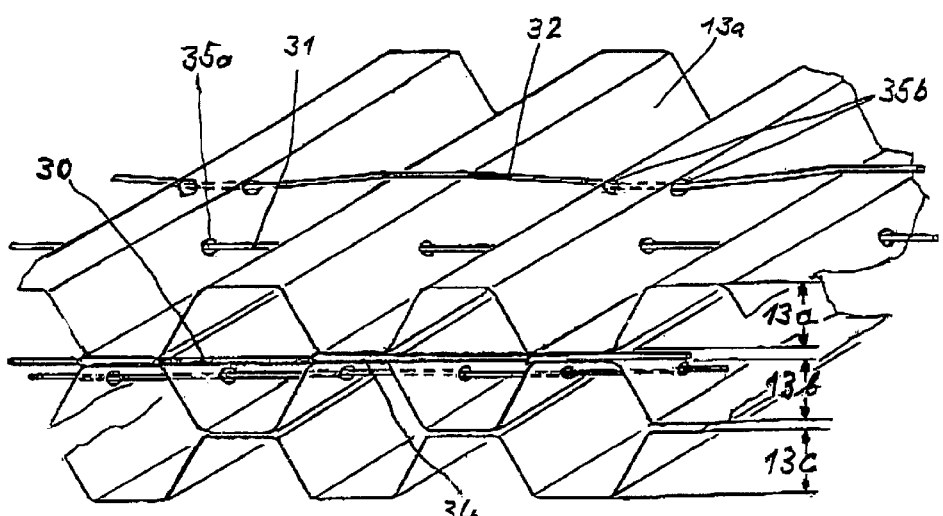
FIG. 2a is a cut apart perspective view showing a cross-section of a honeycomb made of trapezoidally structured thin foil layers.

FIG. 2a shows a cross-section of a section of a honeycomb made of trapezoidally structured thin foil layers 13a, b, c stacked one above the other in plane fashion, the fold ends of which are connected to each other by means of webs 34. Opposite foil layers form hexagonal flow ducts. The honeycomb structure is stabilised by wires running parallel to foil layers 13a, b, c. Wire 30, located in the fold line, is clamped in fold webs 34, while wire 31, part of the way up the foil layer, is loosely guided through the foil through holes 35a and wire 32, at the top edge of foil layer a, is woven into the foil with the aid of holes 35b, with a difference in height at each corrugation, and fixed to it by a frictional connection. The individual wires 30, 31, 32 can be provided in the honeycomb structure either alternatively or simultaneously, and wires 31, 32 can also run at an angle to the corrugations.

Figure 2B:
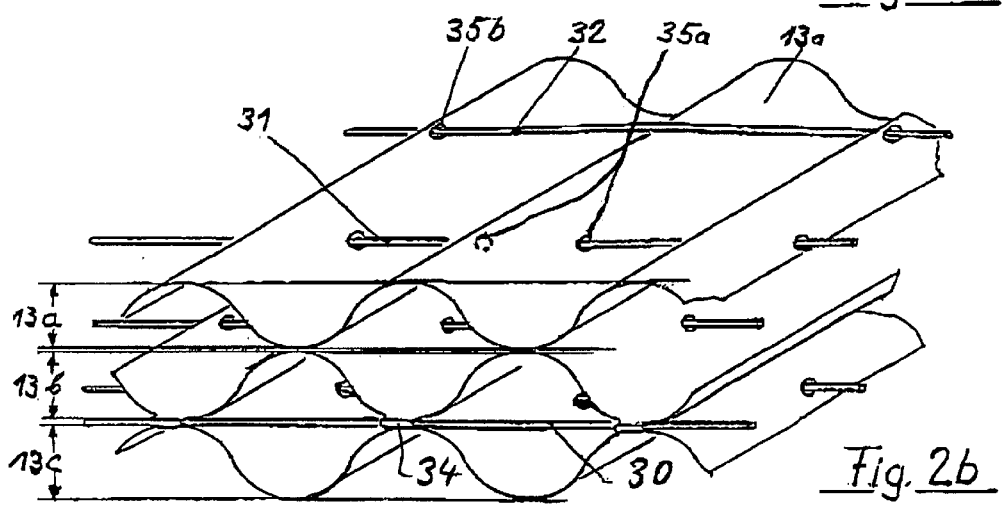
FIG. 2b is a similar cut-away perspective view showing a cross-section of a honeycomb made of single-corrugated or sinusoidally structured thin foil layers.

FIG. 2b shows a corresponding section of a honeycomb structure made of single-corrugated or sinusoidally structured thin foil layers stacked one above the other in plane fashion, where stabilisation is accomplished by wires 30, 31, 32, as in FIG. 2a.

Figure 3:
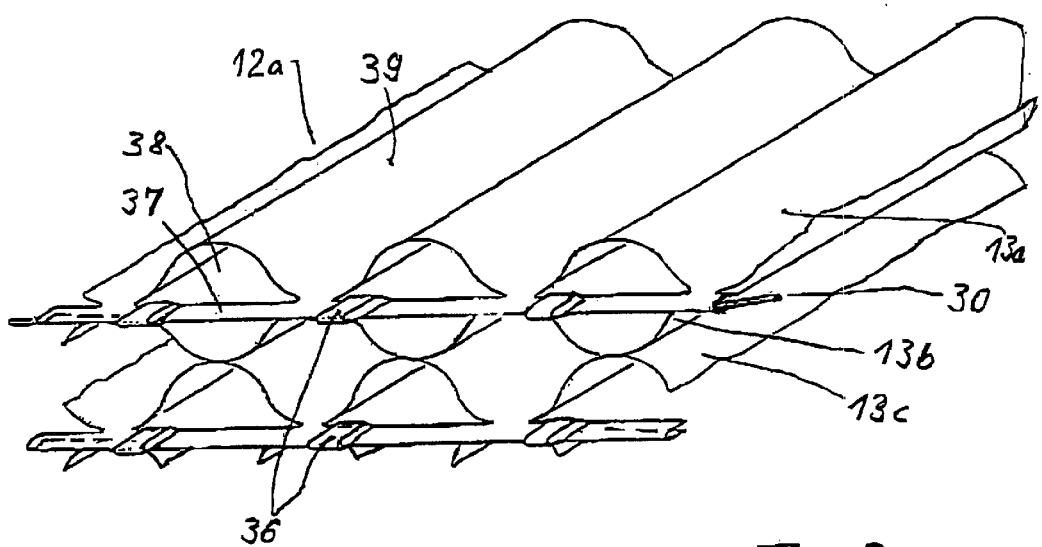
FIG. 3 is a similar cut-away perspective view showing a section of a honeycomb formed of a foil strip laid in zigzag fashion with corrugated foil layers.

FIG. 3 shows a section of a honeycomb consisting of foil strip 12a, laid in zigzag fashion, with corrugated foil layers 13a, 13b and 13c. The stiffening element is designed as a fold web 37, integrally moulded on the foil layers, which projects outwards from the face ends of flow ducts 38 and runs parallel to the centre plane of flow ducts 38. Fold web 37, which is separated from corrugated wall 39 of the flow duct by cutting or punching, displays a fold 36 at the level of each flow duct 38 such that the fold web is shortened to the diameter of flow duct 38. Fold 36 can be formed together with the corrugation of foil layers 13a, 13b and 13c, or starting from a curved fold web. Additional stabilising wires 30 are clamped in fold web 37, which extends over the entire honeycomb or part thereof.

Figure 4:
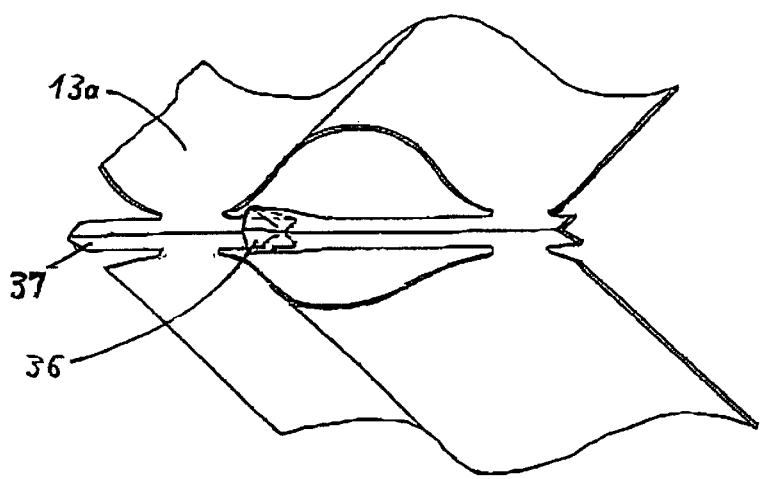
FIG. 4 is a partial perspective view showing a section of the FIG. 3 honeycomb structure in only partially folded condition.

FIG. 4 shows a section of the honeycomb structure according to FIG. 3 in only partially folded condition, where the foil tuck for forming fold 35 can be seen.

FIG. 5 shows a section of an originally smooth, thin foil strip for manufacturing the honeycomb according to the invention. In order to pre-shape thin foil strip 12a, grooves 41 are stamped into the strip in its longitudinal direction, either hot using stamping rolls, or by means of laser beams. Fold lines 40 run perpendicular to these in order to permit folding of the foil strip in zigzag fashion in order to produce a stack. At the level of fold lines 40, narrow webs 42 of width b are formed by punched holes 43 of dimension a in the longitudinal direction of the strip. Dimension a determines the inlet apertures of the individual ducts of the finished honeycomb structure as regards their height or the maximum width of stiffening elements inserted between the webs. Adjacent to foil sections 12a, areas can also be left in the punched holes, by means of which stiffening elements running perpendicular or parallel to the foils can be fastened in positive fashion.

FIG. 6 shows a vertical longitudinal section through a honeycomb according to the invention. When placed one on top of the other, pairs of channels in foil strip 12a form flow ducts, through which an exhaust gas can flow in flow direction S. Narrow, thin strips 34a, which are held by webs 42, are inserted in fold lines 40 at the inlet side E and the outlet side A of the honeycomb structure. Webs 42 are located upstream of inlet openings E and their cross-section is widened by the inserted strips, this resulting in a catalytically more effective arrangement.

As illustrated on the left in FIG. 7, fold web 42, which connects foil layers 13a, 13b, can have a certain height h, so that foil layers 13a, 13b are some distance apart. In order to prevent buckling of web 42, an appropriately dimensioned strip or profiled section can be inserted between foil layers 13a, 13b, and it is also possible to provide notched tabs on the foil layers that rest on the opposite foil layer.

According to the right-hand side of FIG. 7, the structure according to the left-hand side of FIG. 7 can be produced by rectangular punched holes 43b and the formation of fold lines or deformation zones, followed by folding and compression of the foil layers.

According to FIG. 8, a honeycomb with essentially rectangular flow ducts 38 can be constructed by appropriately profiling a foil strip 12a. In order to produce walls 45 in the form of double folds, which form the lateral borders of flow ducts 38, fold lines 41 are made in the foil strip. Webs 42, which connect foil layers 13a, 13b and 13c and are produced by rectangular lead-throughs 43 in foil strip 12a, are cut on both sides of the fold lines, resulting in foil sections 44, which are connected to webs 42 on one side and are folded into the flow duct in order to stabilise the inlet area. At the same time, foil sections 44 can serve to fasten wires guided parallel or perpendicular to foil layers 13a, 13b and 13c. Fold lines 46a, 46b, 46c, 46d and cuts 47 are made in the foil layers parallel to lead-throughs 43 and a distance from them. Foil sections 48a are folded over in order to shorten fold webs 45 and produce folds 48b, with the result that foil sections 49 are angled and cuts 47 are enlarged to form triangular gaps (see middle of FIG. 8).

As shown at the top of FIG. 8, foil layers 13a, 13b, 13c are positioned on top of each other with webs 45 arranged one above the other in parallel alignment. Angled foil sections 49 then reach around web 45 of the foil layer below, so that adjacent foil layers are connected to each other in positive fashion by stiffening wires 31, in which context wires 31 are located above foil sections 49 and guided through cuts 47 and the upper area of adjacent web 49.

In addition, cuts are made on the top side of webs 45, forming tabs 45b which are inserted into the fold of web 45 above and fixed in it in non-positive fashion. As a result, partition walls 45a are created within the honeycomb structure, these acting as stiffening zones and additionally stabilising the honeycomb structure.

Furthermore, the base of flow ducts 38 is provided with notched tabs 45c, which serve the exchange of gas between adjacent flow ducts and/or to provide support at the base of the flow duct below.

FIG. 9 illustrates another version of the stabilisation of the honeycomb structure with wires 50, which simultaneously connect adjacent foil layers 51a, 51b to each other. For this purpose, cuts are made at intervals in some of the corrugations 52 of the foil layers, this resulting in alternating upward-pointing areas 55 and downward-pointing areas 56 following compression of these corrugations. After folding the foil strip, areas 55 of adjacent foil layers, which engage areas 56, are arranged in line with each other, as shown in FIG. 9a, thus producing a duct 57, through which wire 50 can be inserted in a manner connecting adjacent foil layers to each other in positive fashion. Like the foil strip, wire 50 is folded in zigzag fashion, although it can also extend over only one foil layer, if appropriate.

In addition to wires 50 and running perpendicular to them, wires 59 are provided, which are located at the level of the cuts bordering areas 55, 56 and laterally bordered by these. Moreover, wires 59 are connected to fold legs 53, which laterally border foil layers 51a, 51b and are connected to each other by jointing, thus resulting in a closed side wall. In addition, wires 59 are pretensioned in order to increase the stiffness of the honeycomb, as a result of which calibration of the honeycomb can be achieved at the same time by setting an appropriate pretension of wires 59 by way of localised electric heating of the honeycomb via electrodes 60. Moreover, wires 54 are also provided, which run perpendicular to the foil layers, penetrate the compressed corrugations and are connected to wires 59.

Figure 10:
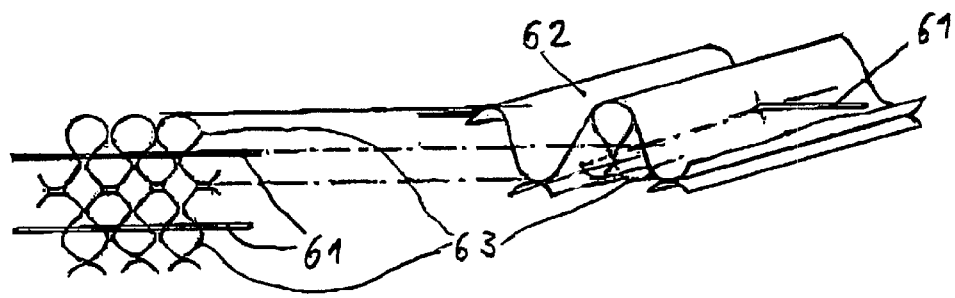
FIG. 10 is a schematic illustration of how the cross-section of the flow ducts can be calibrated or altered using pre-tensioned wires.

FIG. 10 illustrates how the cross-section of the flow ducts can be calibrated or altered by means of pretensioned wires 61, which are drawn through a profiled foil layer 62. In the practical example shown, wire 61 is drawn through corrugated foil layer 62 half way up and fixed to the end of the foil layer. By exerting a tensile force on wire 61 or by compressing foil layer 62 in the longitudinal direction of the wire, the corrugated shape of the foil layer represented by the solid line can be transformed into shape 63, represented by the broken line and illustrated alongside, wire 61 being pretensioned in this context. Correspondingly, stiffening elements can also be provided that pass through the foil layers transverse to their corrugation at several different levels, e.g. at ¼, ½ and ¾ of the height of the same, as a result of which different duct cross-sections can be produced.

Figure 11:
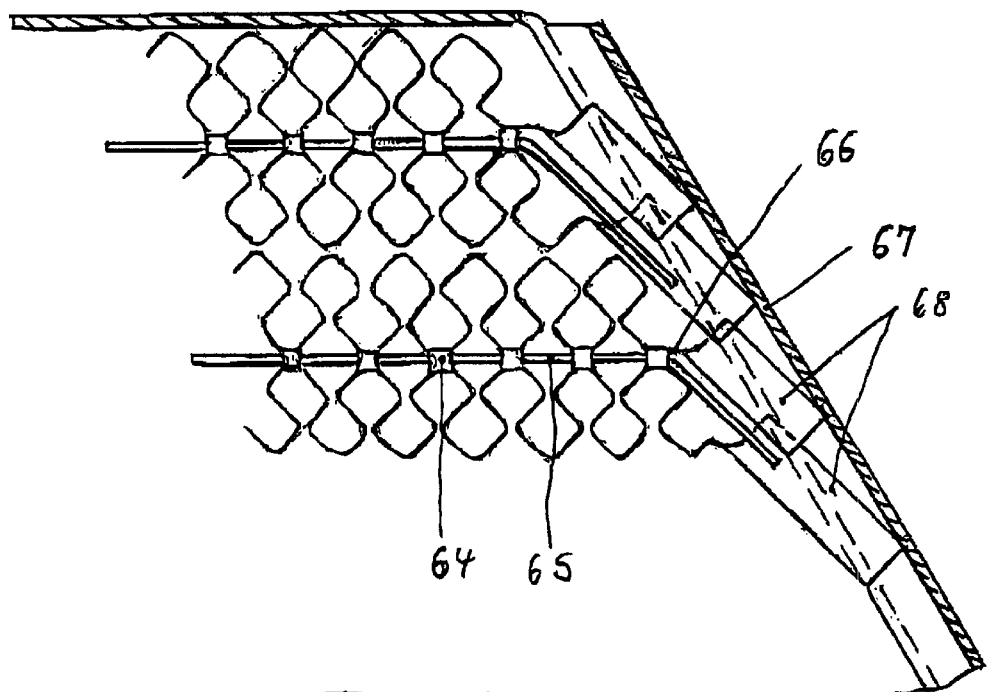
FIG. 11 shows profiled foil layers and wires clamped between webs.

According to FIG. 11, given foil layers profiled according to FIGS. 2a, 2b, 10 and 11, wires 65 can be clamped between webs 64, where the ends of wires 65 are integrated in the side walls made up of downward folds in end areas 66 of the foil layers in a manner capable of absorbing tensile forces. The end areas of foil layers 66 are provided with notched tabs 68, which serve to fasten the honeycomb to housing 67. Instead of wires 65, it is also possible to clamp strips in fold webs 64, which can be fixed to housing 67.

According to FIG. 12a, a middle partial area of foil layers 70 can have a vertical offset, where the offset lines 71 of adjacent foil layers can be located in a plane 72 that preferably runs parallel to the direction of flow. If, as illustrated in the figure, the vertical offset amounts to the height a of a foil layer, wires 73 run at the level of webs 74, in which they are clamped in a manner capable of absorbing tensile forces, over half the width of a foil layer and loosely between adjacent foil layers 70a, 70b over the other half of the foil layer. In this context, the ends of wires 73 are integrated in the side walls made up of the foil ends. The width of the honeycomb can be calibrated or altered by applying a tensile force to wires 73. In this context, either only the right-hand half or the left-hand half of the foil layer can be specifically calibrated or deformed by applying tensile forces only to every other wire 73.

As illustrated in FIG. 12b, the vertical offset of the foil layers can also be twice the foil height b, this increasing the length of expansion legs 76. In this way, the areas of the honeycomb separated by the expansion legs can be isolated from each other as regards forces.

FIG. 13 (left) shows stiffening elements in the form of inserts 80, which are integrally moulded on the two ends of foil layers 81a and can be inserted into the flow duct formed by foil layers 81b, 81c and fixed there by means of a frictional connection. FIG. 13 (right) shows a front view of a foil layer of this type. The lateral end areas of foil layer 81a are provided with downward folds 82, which can be connected to corresponding downward folds of foil layers located above or below them and fixed in beads of the corresponding housing.

FIG. 14 shows a configuration in which the honeycomb is constructed of identical foil sections 90a,b,c, each of which displays two corrugated sections 92, 93, which are connected to each other via a bending area 91 and on the free ends of which inserts 95 are integrally moulded via connecting webs 94. In folded condition, the two inserts 95 are located on the same side of foil section 90, meaning that, when foil sections 90 are arranged so as to be rotated through 180° relative to each other, the inserts of the adjacent foil layers can engage the face end of flow duct 96 formed by foil section 90.

FIG. 15 shows a configuration with a separate insert 100, the height of which extends over several flow ducts of foil strip 101, which is laid in zigzag fashion, and can engage the face ends of these. A corresponding insert can also be inserted at the opposite face end of the laid foil strip. In the practical examples illustrated, the contour of the inserts corresponds to that of the flow ducts, although this is not necessary.

Figure 16:
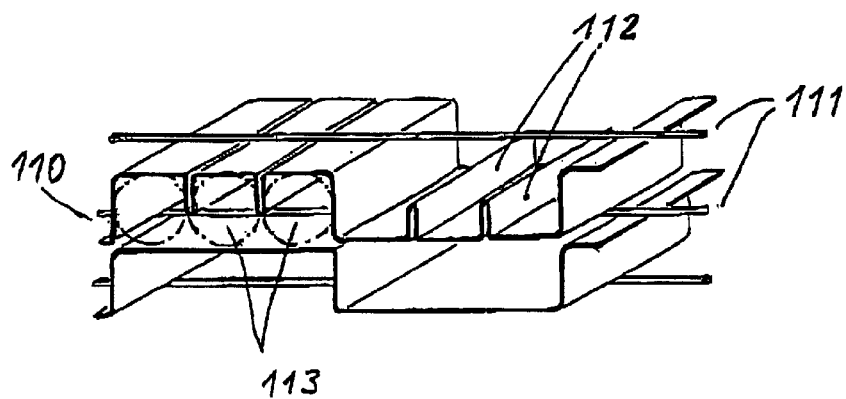
FIGS. 16 and 17 are perspective views of other configurations.

FIG. 16 shows a configuration in which, in addition to stiffening wires 111 located between the individual foil layers 110, additional stiffening webs 112 are provided in the form of doubled foil areas, which simultaneously act as flow ribs, where the height of the webs is roughly half the height of flow paths 113, indicated by broken lines. The foil layers forming rectangular flow ducts are arranged in congruent fashion relative to each other, where wires 111 prevent slipping of the troughs of one foil layer into the depressions in the foil layer below. The foil layers can also be arranged in the opposite direction relative to each other, meaning that the stiffening webs of a first foil layer are opposite to those of the second foil layer and flow ducts of twice the height are formed.

Figure 17:
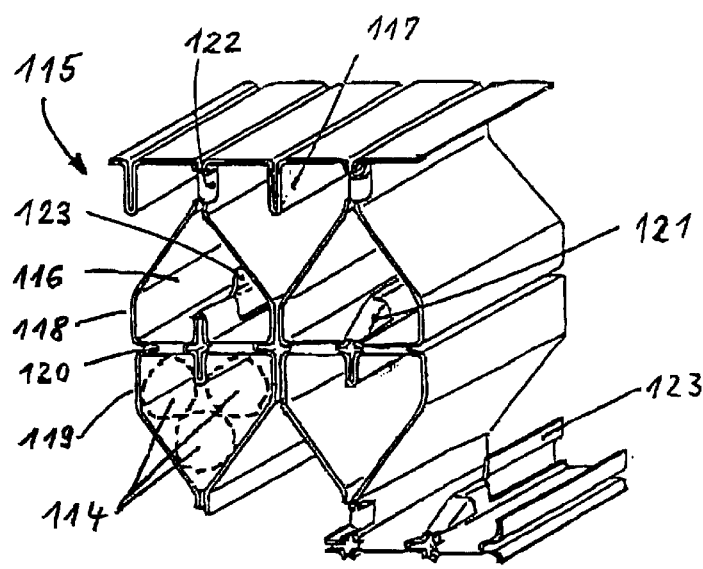

FIG. 17 shows a foil strip 115, laid in zigzag fashion, with heart-shaped flow ducts 116, which are divided by stiffening webs 117, formed by doubling the foil layer. As indicated by the broken circles, this combines groups of three flow paths 114 into a single, larger flow path, enabling gas exchange in the process. In this context, adjacent foil layers 118, 119 are connected to each other by connecting webs 120. For additional stiffening, corner areas 121 of stiffening webs 117 are beaded, and beaded areas 122 are provided in the area of the doubling of the contacting side walls of adjacent flow ducts by making cuts. In addition, stiffening webs 117 display notched tabs 123, which reach into the flow duct and increase the catalytically active surface in the flow ducts. The beading of stiffening webs 117 and of areas 122 produces isolated stiffening elements which prevent elongation of the honeycomb structure in a direction transverse to the flow ducts and parallel to the foil layers. In this context, the beads can be provided both at the face ends of the flow ducts and in their interior.

FIG. 18 shows a foil strip 130, laid in zigzag fashion, where the height h of the virtually rectangular corrugations 131 is a multiple of the width b of the same (approx. 4:1). The corrugations are laterally offset by a fraction of the width of the same relative to each other and open in the direction of the opposite foil layer. The individual corrugations, which are inclined relative to the plane of the foil layer, are connected to each other by connecting webs 132 (see enlarged section on the right in FIG. 18). FIG. 18 (bottom) shows the foil strip before being folded. The asymmetrical shape of punched holes 133 relative to the longitudinal direction of foil strip 131 leads to an offset x of the corners of the parallelogram and brings about an offset of the upper or lower vertex 134, 135 of the foil corrugations, meaning that the lower vertex of a foil corrugation is located above the open side of the flow duct of the foil layer below. Offset y defines the face-end inclination or the axial offset of the upper vertex relative to the lower face edge of the foil corrugations. In all, this thus results in a configuration where gaps extending over the entire width of the honeycomb are formed between opposite corrugations, meaning that an exchange of medium also takes place over the entire width of the honeycomb through the adjacent gaps. As the punched holes along a fold line can generally also be of different design, the width of the honeycomb over which an exchange of medium is possible in the transverse direction can be adjusted. Stiffening wires not shown in the illustration are inserted between the foil layers.

FIG. 19 shows a foil strip 140, laid in meandering fashion, with virtually rectangular corrugations, where lower vertices 141 of a foil layer are located above the open sides 142 of the foil layer below. At certain intervals, the foil layers display a vertical offset 143, forming legs, which extends over an integral multiple of the height h of the corrugations and where the legs can be connected to form partition walls. Stiffening wires 144, arranged perpendicular to the corrugations, lie on flattened areas 145, which are produced by slits cut or grooves impressed into the foil layers, so that the lower vertex 141 of a foil layer is located below the upper vertex 146 of the foil layer below. Connecting wires are passed through doubled foil areas 147, which are produced by notched foil sections on the face ends or in the interior of the flow ducts. Furthermore, web-like notched tabs 148, running in the longitudinal direction of the flow ducts, are provided, which rest on the opposite side wall of the flow duct and simultaneously permit the exchange of gas through lead-throughs 149.

FIG. 20 shows another configuration of a honeycomb in a section displaying an asymmetrical cross-section of flow ducts 151 in relation to the plane of foil layers 150. To this end, foil strip 152 is provided with rectangular punched holes 155 in the area of fold lines 154, the fold line running along their diagonal. For additional stiffening, fold webs 156 are provided, which run in the longitudinal direction of the flow ducts and whose notched tabs 157 rest on stiffening wires 158, in place of which layers of expanded metal or wire mesh can also be provided. Moreover, stiffening wires 159 are clamped in the connecting webs of the foil layers. Given an appropriate height of the fold webs, these can also rest directly on the wires.

FIG. 21 shows a section of a honeycomb with a foil strip 251, laid in meandering fashion, and expanded-metal layers 258 extending transverse to it, the ends of which that project beyond the individual foil layers 257 are folded around the respective foil layer ends and engage the adjacent flow duct. End areas 262 of expanded-metal layers 258 then stand perpendicular to the respectively opposite foil layers 257 and either rest on them or support them. For purposes of stabilisation, each of the foil layers of the foil strip displays two stiffening ribs 253, 254 running transverse to the direction of flow indicated by the arrows, the length of fold webs 255 being large compared to the distance between foil layers. In order to form the upward and downward-pointing ribs 253, 254, foil sections 256, located in the area of the fold, are laterally folded outwards, simultaneously serving to fasten the honeycomb to a housing (not shown).

Expanded-metal layers 258 display sections 259, extending in the longitudinal direction of the flow ducts and resting on the foil layers at the face end, which stand vertically on the foil layers and support the foil layer above. Sections 259 are provided with lateral bulges 260 to increase the stiffness in the event of compressive forces acting vertically on the foil layers, and are guided through ribs 253 without play in vertical gaps. Foil sections 259 can also display areas of lower height, which can be arranged between bulges 260 and enable an exchange of fluid. Foil sections 259 are connected to each other by intersecting connecting webs 261, which are integrally moulded together at the points of intersection, can be produced by making cuts in the foil layers and also permit an exchange of fluid in the transverse direction. Instead of using individual expanded-metal layers, these can, like foil layers 257, be connected to each other to form an endless expanded-metal strip that is laid in meandering fashion. The expanded-metal layers simultaneously serve to increase the active catalyst surface.

According to FIG. 22, expanded-metal layers 287 can be inserted between the individual foil layers 277 with corrugated profile, this simultaneously allowing the distance between foil layers to be adjusted as required. In this context, the one-piece expanded-metal layers display elongated sections 289 in the form of narrow strips arranged perpendicular to the principal planes of the foil layers, as well as connecting webs 291, which are connected to each other via points of intersection. The points of intersection are inserted in recesses 290 in the foil layers in a manner preventing movement and can be additionally fastened here, e.g. by soldered connections or by stiffening wires running vertical to the foil layers. The expanded-metal layers can be fixed on lateral fold webs of the foil layers. Corresponding to the foil strip, the expanded-metal layers can also be designed as a strip laid in meandering fashion. Profiles 289, around which flow is possible, simultaneously improve pollutant conversion in the ducts.

FIG. 23 shows a honeycomb 160, which is provided with a gas inlet 162 and a gas outlet 163 in a housing 161. In this context, inflow into flow ducts 164 of the honeycomb is at an angle. In the inlet and outlet area, the individual foil layers of the honeycomb are (see detail view) connected to each other by separate inserts 165, the free ends of which are at the same time shaped by the provision of bevelled areas 166 in such a way that the inlet aperture into the flow ducts in the direction of flow is greater than the cross-section of the flow ducts in a plane perpendicular to their longitudinal direction. This makes it possible to increase the catalytic efficiency of the honeycomb in the area where the gas to be purified flows into the flow ducts and to reduce pressure losses caused by turbulence in the outlet area. At the same time, the inserts stabilise the inlet and outlet areas of the honeycomb, e.g. by increasing the wall thickness, whereas the ducts retain their larger cross-section unchanged in the middle area of the honeycomb, e.g. with gaps extending over the entire width which, although they are less stable, permit an unobstructed exchange of fluid transverse to the honeycomb.

Figures 24A, 24B:
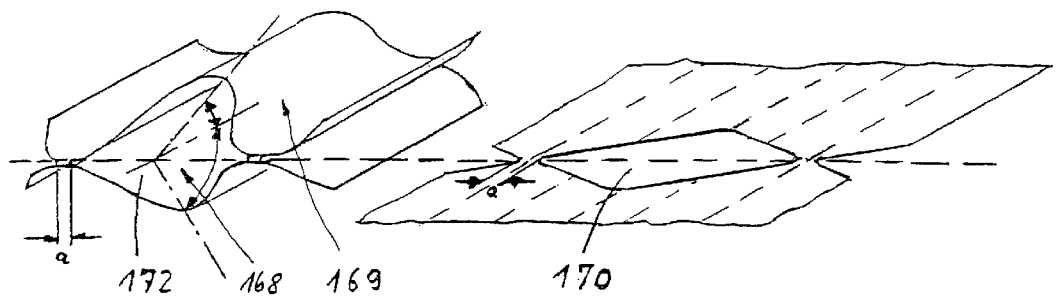
FIG. 24a is a perspective view showing a foil layer for manufacturing a further embodiment of a honeycomb according to the present invention.
FIG. 24b is a perspective view of a foil layer according to FIG. 24a, being folded.
Figures 25A, 25B:
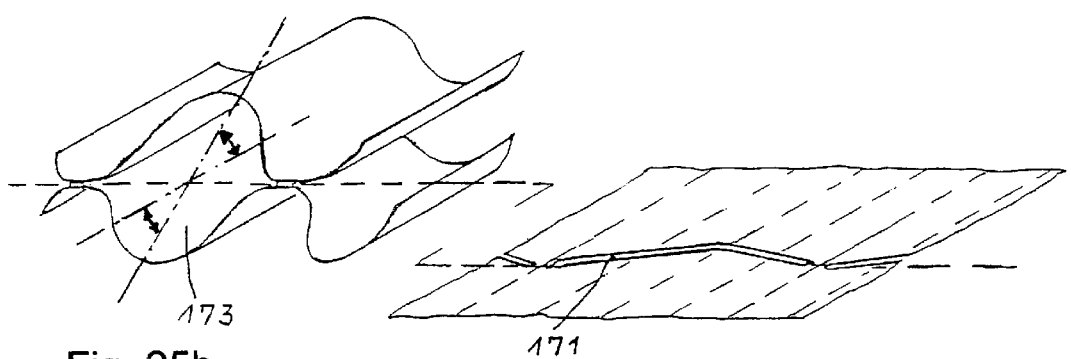
FIG. 25a is a perspective view of a foil layer for manufacturing a further embodiment of a honeycomb according to the present invention.
FIG. 25b is a perspective view of the foil layer according to FIG. 25a, being folded.
Figure 25C:
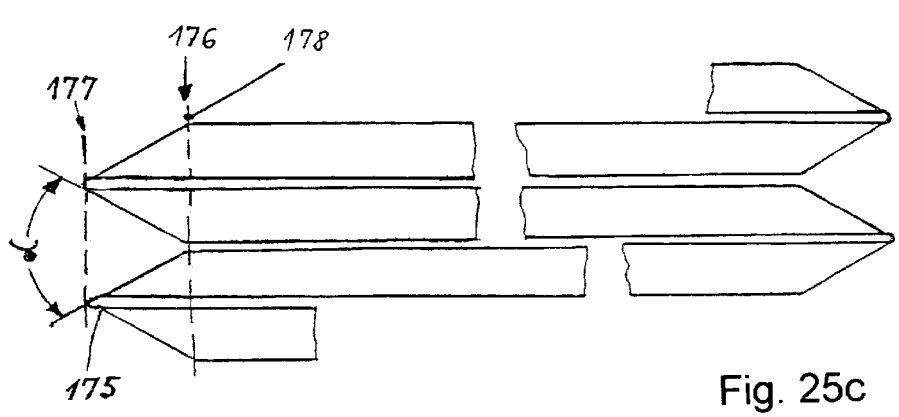

FIGS. 24 and 25 illustrate that, given an appropriate shape of punched holes 170 and cuts 171, which are of rhombic and V shape in the practical example shown, end areas 169 of the individual flow ducts can be structured in such a way that they display a different cross-section or contour at the face end than the areas of the flow ducts a distance away from the ends of the honeycomb or the envelope of the face area of the entire honeycomb, this being the case if, for example, the face ends of the flow ducts do not lie perpendicular to the longitudinal direction of the flow ducts. The flow conditions upstream of the inlet areas into the flow ducts, which are defined by the projecting foil sections 172, 173, and also their position, can be defined in this way, meaning that the inlet areas of the honeycomb can be adapted to suit the respective requirements.

Generally speaking, means 175 are, as also illustrated in FIG. 25 (bottom), thus provided upstream or downstream of the inlet and/or outlet area of a structural body (cf. also FIGS. 3, 26), which project axially from face ends 176 of the honeycomb or structural body (as shown at the bottom of FIG. 25) and bring about deflection of the flow of a medium in relation to the principal direction of flow within the structural body or its longitudinal direction. Flow deflection can, for example, take place in the manner of a macroscopic change in the direction of flow (see FIGS. 22, 26, for example) or also, for example, in the manner of swirling, as at the front or deflecting edges 175 of the cuts in FIG. 25 (bottom). The means can be separately assigned to each flow duct or flow path. The dimensions of the means in the direction of flow can be small compared to the length of the structural body, e.g. in the region of several times (e.g. 10), or less than, the diameter of the duct or flow path. There is thus a continuous or stepwise change in the flow conditions by structural elements in the inlet area of the structural body, starting from the face-end envelop 177 of the projecting flow deflectors and extending over a certain depth which can, for example, correspond to 0.5 to 10 times (without limitation) the width of the flow ducts or the distance between the core flows, i.e. the flow paths with the highest flow velocities. The means can be integrally moulded on the foil layers, e.g. by the cuts described above, or produced by the axial elongation of structured or plane foil layers, or designed as separate components, e.g. in the form of axially extending wires. The means can be arranged concentrically in relation to the flow ducts or flow paths with the highest flow velocity, or also between these. The axial projection of the flow deflectors refers to the face end or the face-end envelope 178 of the honeycomb, which defines the start of the individual flow ducts or flow paths, which arise from the splitting of the overall flow hitting the structural body into component flows, in the inlet area of the structural body. The projecting means can thus correspondingly also be provided on honeycombs having a conically shaped face end, which can be produced, for example, by telescoping a coiled strip. In particular, the means can, if appropriate, also be realised on structural bodies without stiffening elements according to the invention, and also, if appropriate, on structural bodies with partially or completely unobstructed fluid exchange in one or two transverse directions. The free ends of the projecting areas can enclose and angle of between 150° and 20°, preferably 90° and 30°, with the face-end area lying centrally between them.

According to FIG. 26, inlet areas 180 into the honeycomb, in which turbulent gas flow prevails, can be designed in scoop-like form, enlarging the inner deflection radius of the flow paths, in order to enlarge the inlet aperture of the flow ducts, align it approximately perpendicular to the direction of flow indicated by arrows 181 and provide an axial offset. To this end, flattened areas 183, which enlarge the deflection radius, are provided on the end of the flow duct ends facing away from the direction of flow, where slits 184 are made in the opposite areas and free ends 185, 186 are bent outwards until they almost come into contact with the flattened areas of the opposite flow duct. Moreover, fold webs 187, which are reinforced and thickened by inserted strips, are angled in the direction of the direction of inflow and thus act as upstream guide vanes. A correspondingly opposite shape can be provided in the outlet area of the honeycomb.

FIG. 27 shows an arrangement of foil layers 263 with fold webs 267, running along the direction of flow, for stiffening the honeycomb structure and increasing the degree of conversion. Foil layer sections 264a, 265a of end areas 264, 265 of the honeycomb are angled in relation to middle area 266, cuts being made in fold webs 267 for this purpose. This reduces pressure losses in the inlet area of the honeycomb in the event of inflow at an angle relative to foil layers 263. At the level of the cuts and in the inlet areas, the foil layers are supported by stiffening wires 269, which are inserted in webs 267 and extend transverse to the direction of flow. Moreover, stiffening wires 268 are provided, which run vertical to foil layers 263 and are partly connected to wires 269.

FIG. 28 shows a cuboid honeycomb comprising individual foils 277 with triangular channels 279 and flow ducts, which can also be of isometric design, extending over the entire width of the foil layers. To achieve low-turbulence inflow into the honeycomb at an angle to the principal plane of the foil layers, the ends of each of channels 279 are provided with a bevel 280, which points towards the free end of the honeycomb and is angled towards the direction of inflow. Face-side end areas 281 of foil layers 277 are provided with stiffening beads 282, into which additional stiffening wires 283 are clamped. Moreover, strips 284 are provided, which run transverse to foil layers 277, rest on the top edges of channels 279 and support the foil layer above.

In the middle area of the honeycomb, the channel-shaped profile of foil layers 277 is interrupted by flattened area 286, which extends over the entire width of the foil layer, runs at the level of the top edge of channel 279 and into which stiffening wires 287 are woven. As a result of this folding, flow channels 279 are continued with a lateral and a vertical offset (see arrow 288), with the result that the fluid passing through one duct area is automatically mixed with fluid passing through adjacent duct areas.

Figure 29A:
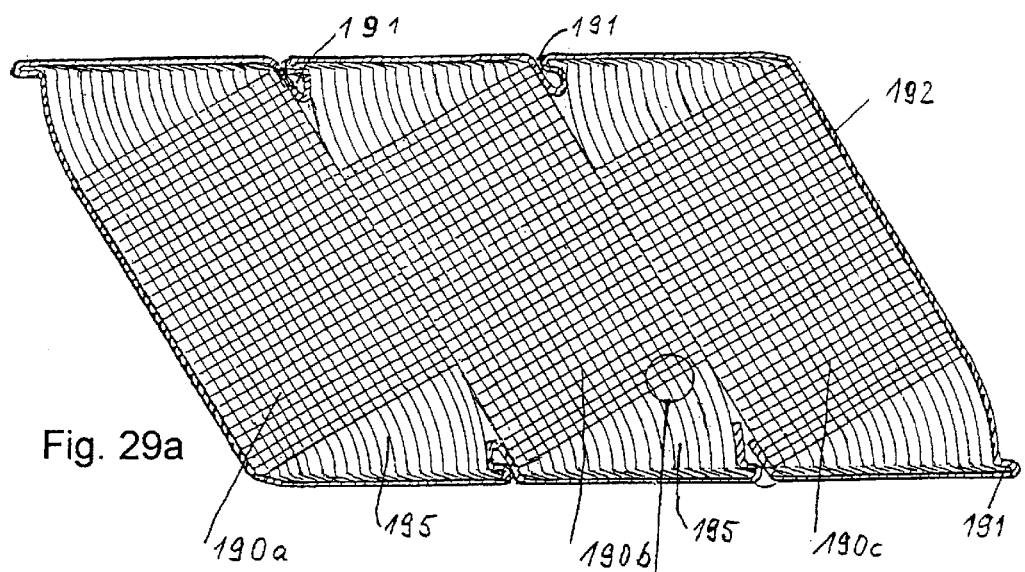
FIG. 29a is a schematic cross-sectional view of a further embodiment of a honeycomb according to the invention being arranged in a housing.
Figure 29B:
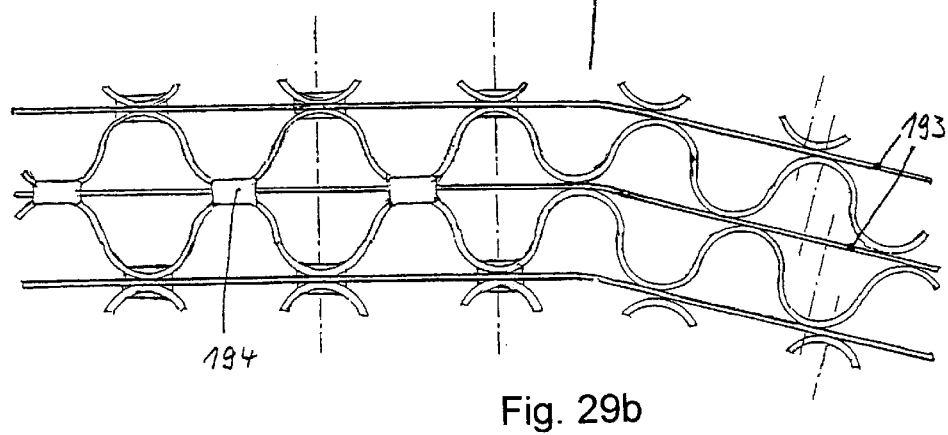
Figure 29C:
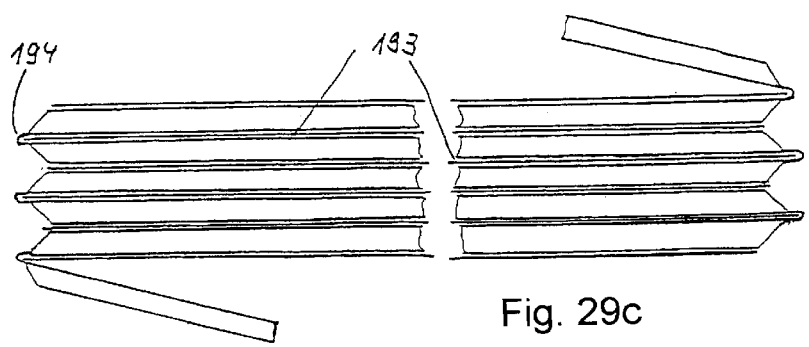
FIG. 29c is a schematic side view of the zigzag folded foil layers of the honeycomb of FIG. 29a in a partially unfolded state.

FIG. 29 shows a honeycomb which consists of three component honeycombs 190a,b,c and is fastened in housing 192 via beads 191. The component honeycombs are each produced from a foil strip laid in zigzag fashion, where stiffening wires 193 or foils are inserted between the individual foil layers. FIG. 29 (middle) shows an enlarged face-end view of the honeycomb structure. According to this, stiffening wires are clamped in webs 194, which connect the individual foil layers, in the hatched area in FIG. 29 (top), thus producing a structure with comparatively great flexural resistance. The connecting webs are removed in areas 195, adjacent to the housing, so that the foil layers can be designed in arched form over the stiffening wires or films set back from the plane of the face end in this area, in that the vertices of the corrugations can shift relative to each other layer by layer, without slipping into each other. This results in expansion zones with a comparatively flexible honeycomb structure and the honeycombs can easily be adapted to non-rectangular housing shapes. Areas of arched shape or that can bend by way of relative shifting of the layers can also be provided within a component honeycomb by removing webs 194 at the face ends of these areas.

FIGS. 30 *a,b,c* shows stiffening elements 25, 26, 27 and 28 in the design of multiple folded single layered foils 21*a*, 21*b* having a smooth or profiled, for instance waved design. The folded sections seperated by folding lines preferably are compressed ao that adjacent folding sections are engaging each other by an engaging area. Additional stiffening elements being designed as wires 29*a* or spirals 29*b* are provided extending perpendicular to the foil layers and intersecting the mutiple folded layer sections.

It should be noted that the honeycombs provided with stiffening elements according to the invention can also display stacks of greatly curved foil layers, these being obtained, for example, if entire stacks of foil layers are folded or wrapped around a central fold line. In this context, the stiffening elements can follow the bending of the foil layers and be connected to them, possibly in a manner capable of absorbing tensile forces.

Regardless of the design of the honeycomb, the stiffening elements according to the invention can be of essentially rigid, or particularly also elastic design, where the elasticity can be less or, given an appropriate arrangement, also greater than that of the foil layers. The elastic properties can refer to the honeycomb under operating conditions, while they advantageously exist over the entire range between operating and room temperature.

What is claimed is:

1. Honeycomb, with a honeycomb structure, comprising
   a large number of ducts running in a longitudinal direction of fluid flow through the honeycomb, where the honeycomb is constructed of foil layers arranged one above the other, all of the foil layers are profiled,
   the honeycomb is build up by said foil layers being stacked onto each other or by a zigzag folded foil strip having individual foil areas being connected to each other by connecting webs,
   a plurality of stiffening elements having a longitudinal direction within the honeycomb, wherein the stiffening elements are separate from the foil layers or integrally molded with the foil layers in the form of webs having two side walls contacting each other over the height of the web or spaced so that a coating compound used to coat the webs does not penetrate the space between fold legs of the webs, wherein
   the stiffening elements over their entire length extend essentially parallel to at least some sections of the foil layers, the dimensions of the stiffening elements transverse to their longitudinal direction are smaller than the dimension of the honeycomb structure in the same direction,
   the stiffening elements are elastically deformable and are connected to the foil layers in a tensile force absorbing fashion,
   several stiffening elements extending essentially parallel to the foil layers are assigned to each one of the profiled foil layers, wherein
   (i) a housing is provided in which the honeycomb is arranged, the stiffening elements extending over the entire honeycomb in the longitudinal direction of said honeycomb and are connected to the housing in tensile forces absorbing fashion, or
   (ii) the honeycomb is provided with at least one elastically deformable stiffening element extending in a direction including an angle to the foil layers and connecting two or more foil layers, wherein the stiffening elements extending essentially parallel to the foil layers are fastened to the stiffening elements at an angle to the foil layers, and
   further wherein
      the stiffening elements extending essentially parallel to the foil layers preventing elongation of the honeycomb in a direction perpendicular to the longitudinal direction of the flow ducts and limiting the minimum distance between each two foil layers.

2. Honeycomb with a honeycomb structure, comprising
   a large number of ducts running in a longitudinal direction of fluid flow through the honeycomb, where the honeycomb is constructed of foil layers arranged one above the other, all of the foil layers are profiled,
   the honeycomb is build up by said foil layers being stacked onto each other or by a zigzag folded foil strip having individual foil areas being connected to each other by connecting webs,
   a plurality of stiffening elements having a longitudinal direction within the honeycomb, wherein the stiffening elements are separate from the foil layers or integrally molded with the foil layers in the form of webs having two side walls contacting each other over the height of the web or spaced so that a coating compound used to coat the webs does not penetrate the space between fold legs of the webs, wherein
   the stiffening elements over their entire length extend essentially parallel to at least some sections of the foil layers, the dimensions of the stiffening elements transverse to their longitudinal direction are smaller than the dimension of the honeycomb structure in the same direction,
   the stiffening elements are elastically deformable and are connected to the foil layers in a tensile force absorbing fashion,
   several stiffening elements extending essentially parallel to the foil layers are assigned to each one of the profiled foil layers, wherein
   (i) a housing is provided in which the honeycomb is arranged, the stiffening elements extending over the entire honeycomb in the longitudinal direction of said honeycomb and are connected to the housing in tensile forces absorbing fashion, or
   (ii) the honeycomb is provided with at least one elastically deformable stiffening element extending in a direction including an angle to the foil layers and connecting two or more foil layers, wherein the stiffening elements extending essentially parallel to the foil layers are fastened to the stiffening elements at an angle to the foil layers, and
   further wherein
      the stiffening elements providing additional catalytically actice surfaces, and
      the stiffening elements extending essentially parallel to the foil layers preventing elongation of the honeycomb in a direction perpendicular to the longitudinal direction of the flow ducts and limiting the minimum distance between each two foil layers.

3. Honeycomb as per claim 2, characterised in that the stiffening elements are designed as separate, essentially one-dimensional components.

4. Honeycomb as per claim 1, characterised in that the stiffening elements are connected to the foils under axial pretension.

5. Honeycomb as per claim 1, characterised in that the stiffening elements extending essentially parallel to the foil layers are constructed as joints between opposite areas of the same foil layer formed by doubling the foil layers.

6. Honeycomb as per claim 1, characterised in that the stiffening elements are arranged in the area of the connecting webs between the foil layers.

7. Honeycomb as per claim 1, characterised in that the stiffening elements are designed as inserts engaging the face ends of the ducts.

8. Honeycomb as per claim 7, characterised in that the inserts are integrally moulded on the foil layers.

9. Honeycomb as per claim 1, characterised in that the stiffening elements are designed as webs extending along the flow ducts.

10. Honeycomb as per claim 9, characterised in that the webs are designed as fold webs of the foil layers.

11. Honeycomb as per claim 1, characterised in that the stiffening elements extending essentially parallel to the foil layers are connected to each other, forming two-dimensionally extending systems of stiffening elements.

12. Honeycomb as per claim 1, characterised in that the stiffening elements are arranged upstream of or in an inlet area of the flow ducts.

13. Honeycomb as per claim 1, characterised in that flow deflectors are provided, which are arranged immediately upstream of inlet areas of individual flow ducts.

14. Honeycomb as per claim 1, characterised in that the stiffening elements including an angle to the foil layers extending perpendicular or parallel to the foils are fastened to the housing.

15. Honeycomb as per claim 1, wherein the stiffening elements are designed as separate, essentially one-dimensional components.

16. The honeycomb of claim 11 further comprising additional stiffening elements extending perpendicular to and connecting foil layers.

17. The honeycomb of claim 6 further comprising flow deflectors arranged immediately upstream of inlet areas of individual flow ducts.

18. The honeycomb of claim 7 further comprising flow deflectors arranged immediately upstream of inlet areas of individual flow ducts.

19. Honeycomb as per claim 1, characterized in that at least one stiffening element including an angle to the foil layers is constructed as an element of the group consisting of partition walls and outer walls of the honeycomb, the walls being build up by folded sections of the foil layers.

20. Honeycomb as per claim 1, characterized in that at least one stiffening element extending essentially parallel to the foil layers is constructed as a connecting web connecting individual fold areas of a zigzag-folded foil strip, the connecting web is integrally molded to the foil layers and is provided with folds at the level of each flow duct such that the web is shortened to the diameter of the flow duct.

21. Honeycomb as per claim 1, characterized in that the corrugated foil layers are provided with flattened areas at the tops of the corrugations at least on one face end of the honeycomb, the flattened areas running at an angle to the longitudinal direction of the honeycomb.

22. Honeycomb as per claim 21, characterized in that the corrugated foil layers are provided with slits extending in the flow direction and ending at the face end of the honeycomb, the foil layer sections being adjacent to the slits in a lateral direction are folded in a direction towards a flattened areas of an adjacent foil layer.

23. Honeycomb as per claim 1, characterized in that the foil layers are provided with punched holes or cuts structuring the face ends of the flow ducts and a housing is provided having a gas inlet and gas outlet providing inflow into the honeycomb at an angle to the longitudinal direction of the flow ducts of the honeycomb.

\* \* \* \* \*